(12) United States Patent
Lee et al.

(10) Patent No.: US 10,454,414 B2
(45) Date of Patent: Oct. 22, 2019

(54) PHOTOVOLTAIC MODULE AND PHOTOVOLTAIC SYSTEM INCLUDING THE SAME

(71) Applicant: LG ELECTRONICS INC., Seoul (KR)

(72) Inventors: Jaedong Lee, Seoul (KR); Youngchan Park, Seoul (KR); Hyeonjae Lee, Seoul (KR); Jangyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 15/671,872

(22) Filed: Aug. 8, 2017

(65) Prior Publication Data

US 2018/0041160 A1   Feb. 8, 2018

(30) Foreign Application Priority Data

Aug. 8, 2016 (KR) .................. 10-2016-0100791
Nov. 23, 2016 (KR) .................. 10-2016-0156791

(51) Int. Cl.
*H02S 40/32* (2014.01)
*G08C 23/04* (2006.01)
(Continued)

(52) U.S. Cl.
CPC .............. *H02S 40/32* (2014.12); *G08C 23/04* (2013.01); *H02J 3/383* (2013.01);
(Continued)

(58) Field of Classification Search
CPC ......... H02S 40/32; H02S 99/00; G08C 23/04; H02J 3/38; H02J 3/383; H02J 7/355
(Continued)

(56) References Cited

U.S. PATENT DOCUMENTS 6,340,958 B1 *   1/2002   Cantu .................. G06F 3/147
                                                        235/383
2012/0048325 A1 *   3/2012   Matsuo .................. H02H 7/20
                                                        136/244
(Continued)

FOREIGN PATENT DOCUMENTS

DE   202015006481 U1   10/2015
JP   2016-171654 A     9/2016
(Continued)

*Primary Examiner* — Fritz M Fleming
*Assistant Examiner* — Jagdeep S Dhillon
(74) *Attorney, Agent, or Firm* — Birch, Stewart, Kolasch & Birch, LLP

(57) ABSTRACT

Disclosed herein are a photovoltaic module and a photovoltaic system including the photovoltaic module. The photovoltaic module includes a solar cell module having a plurality of solar cells, an inverter to convert DC power from the solar cell module to AC power, a cable to output the AC power from the inverter, and an infrared (IR) communication unit to transmit, at least one of voltage information of the solar cell module, current information of the solar cell module, voltage information of the inverter, and current information of the inverter, to an adjacent first photovoltaic module, an external gateway, or an external IR communication device. Thereby, communication with an external terminal can be easily performed.

17 Claims, 32 Drawing Sheets

(51) Int. Cl.
  *H02J 3/38* (2006.01)
  *H02J 13/00* (2006.01)
  *H02S 50/00* (2014.01)
  *H02S 40/34* (2014.01)
  *H02S 50/15* (2014.01)

(52) U.S. Cl.
  CPC .......... *H02J 13/0065* (2013.01); *H02S 40/34* (2014.12); *H02S 50/00* (2013.01); *H02S 50/15* (2014.12); *Y02E 10/52* (2013.01); *Y02E 10/563* (2013.01); *Y02E 40/72* (2013.01); *Y02E 60/7884* (2013.01); *Y04S 10/123* (2013.01); *Y04S 40/143* (2013.01)

(58) Field of Classification Search
  USPC ........ 307/82, 80, 87, 66, 64, 9.1, 10.1, 10.2, 307/10.7
  See application file for complete search history.

(56) References Cited

U.S. PATENT DOCUMENTS

| | | | |
|---|---|---|---|
| 2012/0316802 A1* | 12/2012 | Presher, Jr. | H02J 7/35 702/58 |
| 2014/0035392 A1* | 2/2014 | Jeong | H02B 15/00 307/117 |
| 2014/0293592 A1* | 10/2014 | Hopper | H05B 33/0803 362/183 |
| 2017/0136908 A1* | 5/2017 | Ricci | B60L 11/1831 |
| 2018/0351401 A1* | 12/2018 | Binder | H02J 3/381 |

FOREIGN PATENT DOCUMENTS

| | | |
|---|---|---|
| KR | 10-2013-0085527 A | 7/2013 |
| KR | 10-2014-0010217 A | 1/2014 |
| KR | 10-1409774 B1 | 6/2014 |

* cited by examiner

PHOTOVOLTAIC MODULE AND PHOTOVOLTAIC SYSTEM INCLUDING THE SAME

CROSS-REFERENCE TO RELATED APPLICATIONS

This application claims the priority benefit of Korean Patent Application Nos. 10-2016-0100791, filed on Aug. 8, 2016 and 10-2016-0156791, filed on Nov. 23, 2016 in the Korean Intellectual Property Office, the disclosures of all of which are incorporated herein by reference in their entirety.

BACKGROUND OF THE INVENTION

1. Field of the Invention

Embodiments of the present invention relate to a photovoltaic module and a photovoltaic system including the same, and more particularly, to a photovoltaic module capable of performing communication with an external terminal in a simple manner, and a photovoltaic system including the same.

2. Description of the Related Art

Recently, as existing energy resources such as oil and coal are being depleted, interest in alternative energy is increasing. Among such alternative energy technologies, solar cells, which convert solar energy directly into electric energy using semiconductor devices, are attracting attention.

The photovoltaic module refers to connection of solar cells for solar power generation in series or in parallel.

When a photovoltaic system including a plurality of photovoltaic modules and outputting AC power to the grid is implemented, it is necessary to monitor information on each of the plurality of photovoltaic modules.

To do this, power line communication by wire is usually used. However, power line communication requires considerable power consumption and increases manufacturing costs.

SUMMARY OF THE INVENTION

Therefore, the embodiments of the present invention have been made in view of the above problems, and it is an object of the embodiments of the present invention to provide a photovoltaic module capable of communicating with an external terminal in a simple manner.

It is another object of the present invention to provide a photovoltaic module capable of reducing power consumption in communicating with a gateway or an adjacent photovoltaic module.

In accordance with an aspect of the present invention, the above and other objects can be accomplished by the provision of a photovoltaic module including a solar cell module having a plurality of solar cells, an inverter to convert direct current (DC) power from the solar cell module to alternating current (AC) power, and to output the AC power, an infrared (IR) receiver to receive a data transmission request from an external terminal, and a light output unit to transmit data corresponding to the data transmission request using light.

In accordance with another aspect of the present invention, there is provided a photovoltaic system including a photovoltaic module to output alternating current (AC) power to a grid, the photovoltaic module including an infrared (IR) receiver and a light output unit, and a terminal including an IR transmitter for IR transmission and a light receiver to detect a light output of the photovoltaic module, wherein the terminal transmits a data transmission request through the IR transmitter and receives data from the photovoltaic module via the light receiver.

In accordance with another aspect of the present invention, there is provided a photovoltaic module including a first solar cell module having a plurality of solar cells, a first inverter to convert direct current (DC) power from the solar cell module to alternating current (AC) power, a cable to output the AC power from the first inverter, and a first infrared (IR) communication unit to transmit, at least one of voltage information of the first solar cell module, current information of the first solar cell module, voltage information of the first inverter, and current information of the first inverter, to an adjacent first photovoltaic module, an external gateway, or an external IR communication device.

In accordance with another aspect of the present invention, there is provided a photovoltaic system including a plurality of photovoltaic modules to output alternating current (AC) power to a grid and to output power generation information by infrared (IR) communication, an IR communication device to receive the power generation information from the plurality of photovoltaic modules by the IR communication, and a gateway to receive the power generation information from the IR communication device based on wired or wireless communication other than the IR communication.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
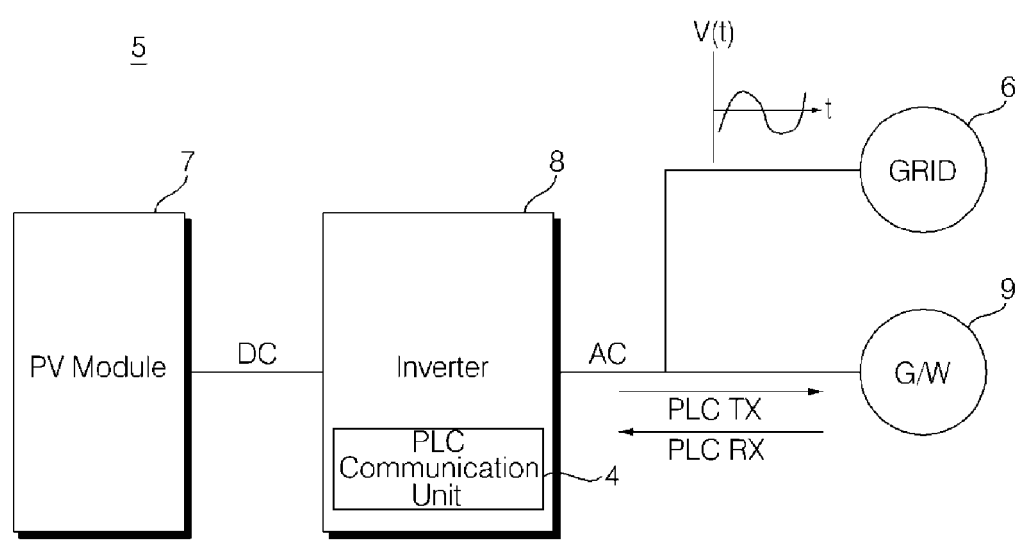
FIG. 1 shows a conventional photovoltaic system.

FIG. 1 shows a conventional photovoltaic system.

Referring to FIG. 1, a conventional photovoltaic system 5 includes a photovoltaic module 7 for outputting DC power, an inverter 8 for converting the DC power from the photovoltaic module 7 into AC power, a grid 6 supplied with the AC power from the inverter 8, and a gateway 9 for monitoring the AC power supplied to the grid or the like.

When a plurality of photovoltaic modules is disposed at the front end of the inverter 8, the inverter 8 may operate as a string inverter.

In this instance, since DC power of several hundred volts (V) is applied to the string inverter 8, the circuit is likely to be broken or a circuit element which is capable of withstanding a high voltage needs to be used.

In order to monitor the gateway 9, the inverter 8 and the gateway 9 should perform power line communication (PLC). For this purpose, each of the gateway 9 and the inverter 8 should be provided with a power line communication unit.

FIG. 1 by example shows a power line communication unit 4 separately arranged in the inverter 8.

Since relatively large power consumption occurs in the power line communication unit 4, the conversion efficiency of the inverter 8 is reduced, and a separate IC (integrated chip) for power line communication is required, which increases manufacturing costs.

In order to solve such a problem, the present invention employs a communication scheme that causes low power consumption and reduces manufacturing costs. Particularly, IR communication and optical communication using a light output unit such as an LED are used together.

To this end, a photovoltaic system 10 (see FIG. 2) of the present invention includes a photovoltaic module 50 having an IR receiver 582 and a light output unit 583, and a terminal (an external terminal) 300 is closely located in the vicinity of a first area Ar1 of the photovoltaic module 50. Details will be described with reference to FIG. 2 and subsequent figures.

Figure 2:
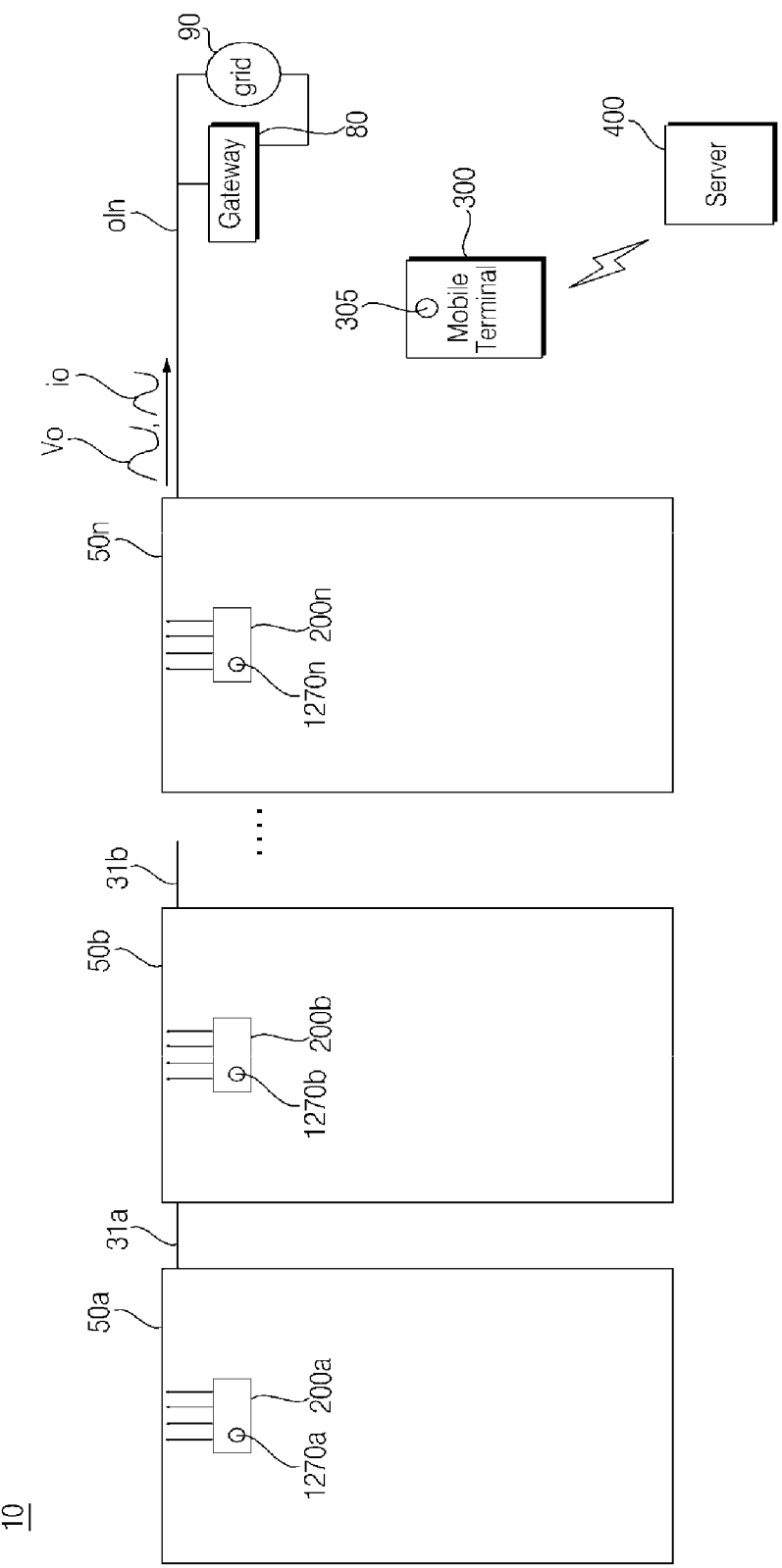
FIG. 2 is a view illustrating a photovoltaic system according to an embodiment of the present invention.

FIG. 2 is a view illustrating a photovoltaic system according to an embodiment of the present invention.

Referring to FIG. 2, a photovoltaic system 10 according to an embodiment of the present invention may include a plurality of photovoltaic modules 50a to 50n, a terminal 300, a server 400, a gateway 80, and a grid 90.

Each of the photovoltaic modules 50a to 50n may output AC power to the grid 90.

Each of the photovoltaic modules 50a to 50n may include a junction box 200a to 200n including an inverter unit (or an inverter) 540a to 540n for converting DC power output from solar cell modules 100a to 100n into AC power.

The junction boxes 200a to 200n may be respectively disposed on the back surfaces of the solar cell modules 100a to 100n, and lenses 1270a to 1270n may be disposed on the outer frames of the junction boxes.

The lenses 1270a to 1270n may be made of a transparent material and the IR receivers 582a to 582n and the light output units 583a to 583n may perform IR communication and optical communication with the external terminal 300 through the lens 1270a to 1270n.

For example, when a lens 305 corresponding to an area in which the IR transmitter and the light receiver of the terminal 300 are disposed is close to a lens 1270 of one of the plurality of photovoltaic modules 50a to 50n, IR communication and optical communication may be performed between the corresponding photovoltaic module and the terminal 300 in a simple manner.

In particular, when the lens 305 of the terminal 300 and the lens 1270 of one of the plurality of photovoltaic modules 50a to 50n are in contact with each other, communication interference with other photovoltaic modules is eliminated, and thus IR communication and optical communication may be stably performed between the photovoltaic module and the terminal 300.

In this manner, when each of the lenses 1270a to 1270n of the plurality of photovoltaic modules 50a to 50n and the lens 305 of the terminal 300 are sequentially brought into contact with each other, the terminal 300 may receive data from each of the photovoltaic modules 50a to 50n.

The terminal 300 may transmit the data received from the plurality of photovoltaic modules 50a to 50n to the external server 400 or the gateway 80 through the communication unit 350 provided therein. Thus, the external server 400 or the gateway 80 may receive the data about the plurality of photovoltaic modules 50a to 50n.

The received data may include operation state information on each of the photovoltaic modules 50a to 50n. Specifically, the received data may include at least one of output current information, output voltage information and output power information on the plurality of photovoltaic modules 50a to 50n, frequency information on the output AC power, and fault status information.

Thus, the external server 400 or the gateway 80 may easily identify the operation states of the plurality of photovoltaic modules 50a to 50n.

The terminal 300 may transmit firmware update information to each of the plurality of photovoltaic modules 50a to 50n.

The plurality of photovoltaic modules 50a to 50n may update the firmware using the received firmware update information.

Figure 3:
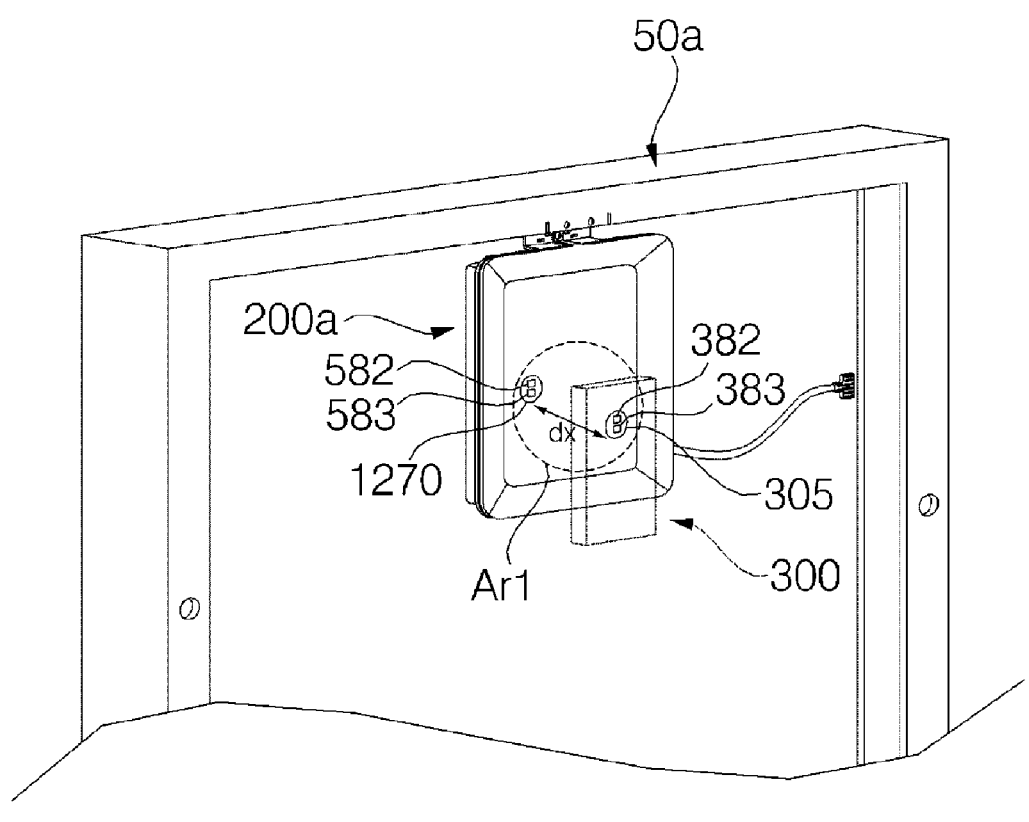
FIG. 3 is a reference diagram for explaining bidirectional communication between the photovoltaic module and the terminal of FIG. 2.

FIG. 3 is a reference diagram for explaining bidirectional communication between the photovoltaic module and the terminal of FIG. 2, and FIGS. 4A to 4C are reference diagrams for explaining a lens disposed in the junction box of FIG. 3.

Referring to FIG. 3, the first photovoltaic module 50*a* of the plurality of photovoltaic modules 50*a* to 50*n* of FIG. 2 may include a junction box 200*a* disposed on the back surface of the solar cell module 100, and a lens 1270 formed on the junction box 200*a*.

Meanwhile, the lens 1270 in the present invention may conceptually include a member made of a material through which light is transmitted in addition to an optical lens.

Figure 4A:
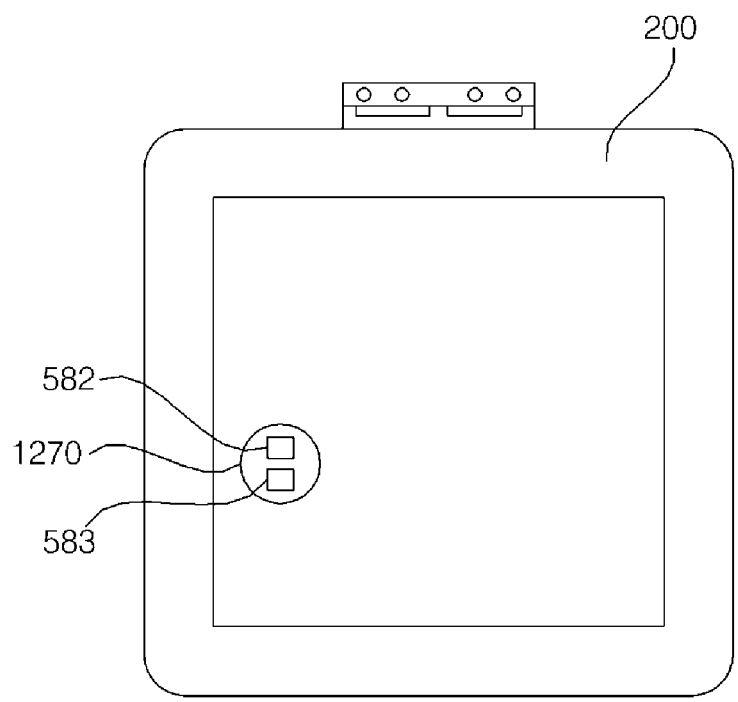
FIGS. 4A to 4C are reference diagrams for explaining a lens disposed in the junction box of FIG. 3.

As shown in FIG. 4A, an IR receiver 582 and a light output unit 583 for outputting visible light may be disposed under the lens 1270.

The first photovoltaic module 50*a* may include a solar cell module 100 having a plurality of solar cells, an inverter unit 100 for outputting AC power converted based on DC power from the solar cell module 100, an IR receiver 582 for receiving a data transmission request from an external terminal 300, and a light output unit 583 for transmitting data corresponding to the data transmission request using output light.

The light output unit 583 may include a light emitting diode (LED), and may transmit data based on the turn-on time and turn-off time of the LED.

The terminal 300 may include an IR ray transmitter 382, a light receiver 383, and a lens 305 corresponding to an area where the IR transmitter 382 and the light receiver 383 are disposed.

The terminal 300 according to the present invention, which is a terminal capable of performing IR communication and visible light communication with the IR transmitter 382 and the light receiver 383 in the photovoltaic module 50, may be a dedicated terminal for communication with the photovoltaic module 50, a cleaning robot for cleaning the photovoltaic module 50, a drone capable of airborne flight, or a mobile terminal, such as a smartphone carried by an installer or an installation service technician. In the following description, the terminal 300 is assumed to be a dedicated terminal for communicating with the photovoltaic module 50.

As shown in FIG. 3, when a data transmission request is received from the terminal 300 through the IR receiver 582 while the terminal 300 is positioned near a first area Ar1 in the photovoltaic module 50*a*, particularly while the lens 305 of the terminal 300 and the lens 1270 of the photovoltaic module 50*a* are positioned at a distance Sx close enough for the lenses to contact each other, the photovoltaic module 50*a* transmits data corresponding to the data transmission request through the light output unit 583 for outputting visible light.

In particular, when the lens 305 of the terminal 300 and the lens 1270 of the photovoltaic module 50*a* contact each other, communication interference with the other photovoltaic modules 50*b* to 50*n* may be eliminated, and IR communication and optical communication based on visible light may be stably performed between the photovoltaic module 50*a* and the terminal 300.

Meanwhile, the terminal 300 may transmit the data received from the photovoltaic module 50*a* to the external server 400 or the gateway 80 through the internal communication unit 350. Thus, the external server 400 or the gateway 80 may receive data about the photovoltaic module 50*a*.

When the photovoltaic module 50*a* receives a request for transmission of the power information on the photovoltaic module 50*a* via the IR receiver 582, the photovoltaic module 50*a* may output at least one of the output current information, output voltage information, output power information, output AC power frequency information, and fault status information on the photovoltaic module 50*a* to the terminal 300 through the light output unit 583.

When firmware update information is received from the terminal 300 via the IR receiver 582, the photovoltaic module 50*a* may update the firmware stored in the memory 590 using the firmware update information.

Here, the firmware update information may include at least one of allowable output voltage range information, allowable output frequency range information, and single-phase or three-phase output information about the photovoltaic module 50*a*.

Figure 4B:
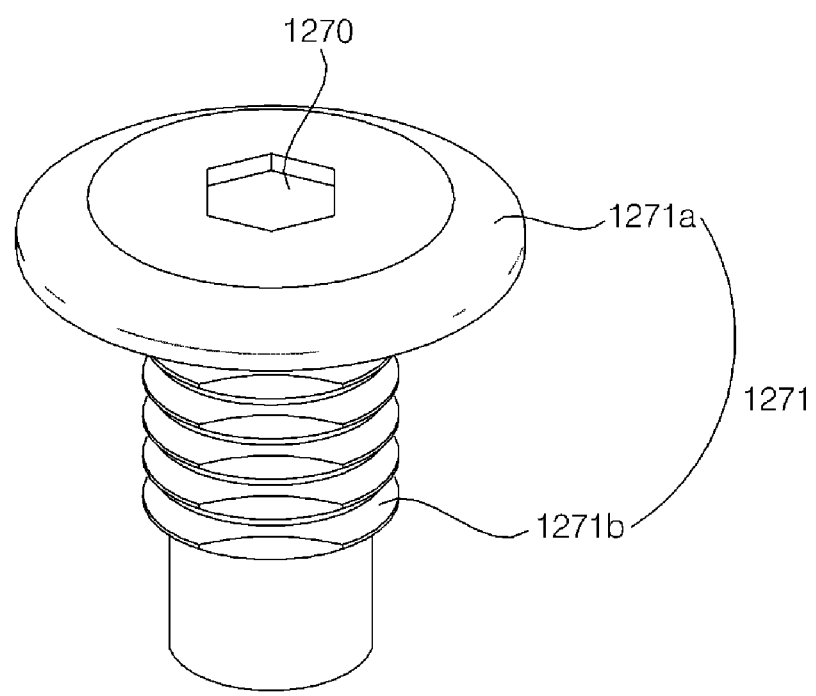
Figure 4C:
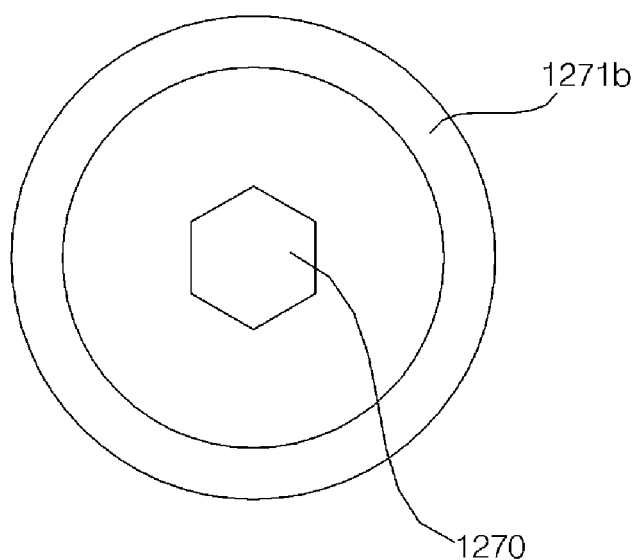

Referring to FIGS. 4A to 4C, the photovoltaic module 50*a* may further include a coupling member 1271 coupled to an opening formed in an outer frame of the junction box 200*a*, and the lens 1270 may be disposed on the head 1271*a* of the coupling member 1271.

The coupling member 1271 may include the head 1271*a* and a bellows 1271*b* having a hollow therein. The lens 1270 may be formed in the head 1271*a* and the bellows 1271*b* of the coupling member 1271 may be coupled with the opening formed in the outer frame of the junction box 200.

To facilitate coupling between the bellows 1271*b* of the coupling member 1271 and the opening formed in the outer frame of the junction box 200, the lens 1270 may be formed in the head 1271*a* to form a step, and may have a polygonal shape (a hexagonal shape in the figure).

For example, when the hexagonal lens 1270*a* is engaged with a hex wrench and rotated, the coupling member 1271 may be easily coupled to or removed from the opening according to the direction of rotation.

The lens 1270 in the coupling member 1271 is preferably made of a transparent material, and both the head 1271*a* and the bellows 1271*b* may also be formed of a transparent material.

The lens 1270 in the coupling member 1271 preferably includes a transparent waterproof material, and further both the head 1271*a* and the bellows 1271*b* may be formed of a transparent waterproof material. Thereby, it is possible to prevent breakdown of the circuit elements inside the junction box 200*a* by infiltration of moisture.

Figure 5:
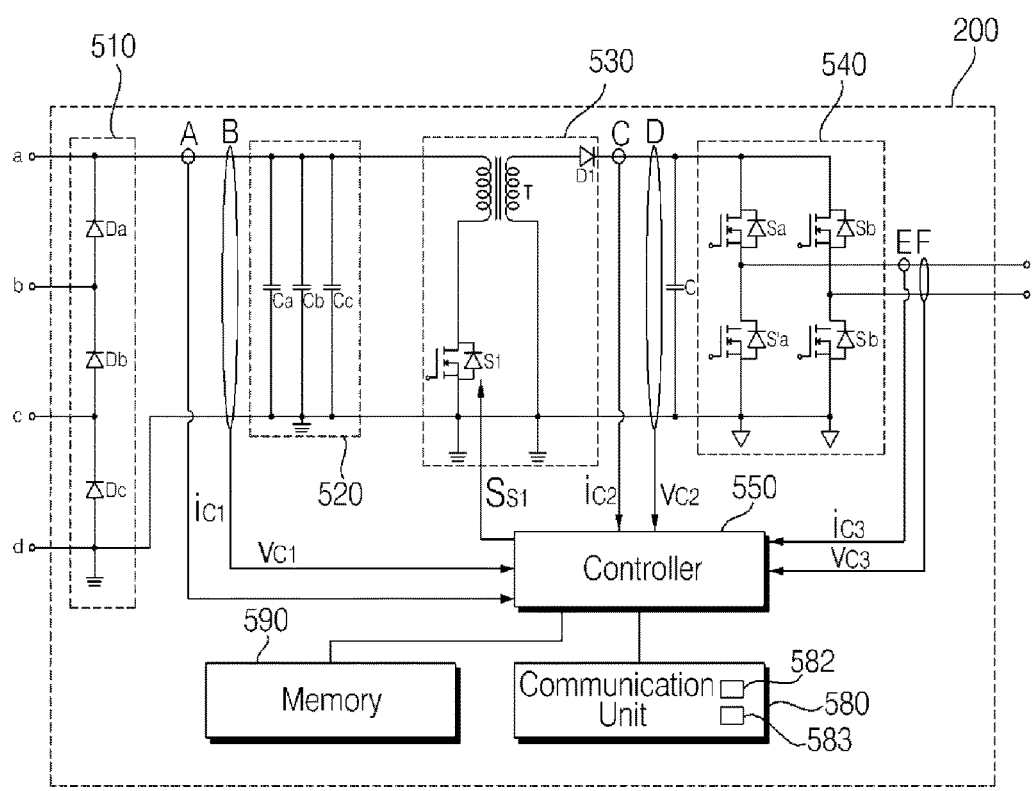
FIG. 5 is an example of an internal circuit diagram of a junction box in the photovoltaic module of FIG. 2.

FIG. 5 is an example of an internal circuit diagram of a junction box in the photovoltaic module of FIG. 2;

Referring to FIG. 5, the junction box 200 may convert the DC power from the solar cell module 100 and output the converted power.

Particularly, in the present invention, the junction box 200 may output AC power.

To this end, the junction box 200 may include a converter unit 530, an inverter unit 540, a controller 550 for controlling the same, a memory 590, and a communication unit 580.

The junction box 200 may further include a bypass diode unit 510 for the bypassing operation and a capacitor unit 520 for storing DC power.

The junction box 200 may further include an input current sensing unit A, an input voltage sensing unit B, a converter output current detector C, a converter output voltage detector D, an inverter output current detector E, and an inverter output voltage detector F.

Meanwhile, the controller 550 may control the converter unit 530 and the inverter unit 540.

The controller 550 may control the converter unit 530 to perform DC conversion. In particular, the controller 550 may perform maximum power point tracking (MPPT) control.

Meanwhile, the controller 550 may control the inverter unit 540 to perform AC power conversion.

The bypass diode unit 510 may include bypass diodes Dc, Db, and Da disposed between first to fourth conductive lines 135a, 135b, 135c, and 135d of the solar cell module 100, respectively. Here, the number of the bypass diodes is greater than or equal to one. Preferably, the number of the bypass diodes is smaller than the number of the conductive lines by 1.

The bypass diodes Dc, Db and Da receive the solar DC power from the solar cell module 100, particularly from the first to fourth conductive lines 135a, 135b, 135c, and 135d in the solar cell module 100. When a reverse voltage is generated from the DC power from at least one of the first to fourth conductive lines 135a, 135b, 135c, and 135d, the bypass diodes Dc, Db, and Da may bypass the reverse voltage.

The DC power passed through the bypass diode unit 510 may be input to the capacitor unit 520.

The capacitor unit 520 may store the input DC power input via the solar cell module 100 and the bypass diode unit 510.

While the capacitor unit 520 is illustrated in the figure as including a plurality of capacitors Ca, Cb, and Cc connected in parallel to each other, the plurality of capacitors may be connected in series-parallel combination, or be connected to the ground terminal in series. Alternatively, the capacitor unit 520 may have only one capacitor.

The converter unit 530 may convert the level of the input voltage from the solar cell module 100 via the bypass diode unit 510 and the capacitor unit 520.

In particular, the converter unit 530 may perform power conversion using the DC power stored in the capacitor unit 520.

For example, the converter unit 530 may include a plurality of resistors or a transformer, and may perform voltage distribution with respect to an input voltage based on a set target power.

While a tapped inductor converter is illustrated as an example of the converter unit 530, a flyback converter, a buck converter, a boost converter, or the like may be employed as the converter unit 530.

The converter unit 530 shown in the figure, namely, the tapped inductor converter, may include a tapped inductor T, a switching element S1 connected between the tapped inductor T and the ground terminal, and a diode D1 connected to the output terminal of the tapped inductor to allow current to flow in one direction.

Meanwhile, a DC link capacitor may be connected between the output terminal of the diode D1, that is, the cathode of the diode D1 and the ground terminal.

Specifically, the switching element S1 may be connected between the tap of the tapped inductor T and the ground terminal. The output terminal (secondary side) of the tapped inductor T may be connected to the anode of the diode D1 and the DC link capacitor C1 is connected between the cathode of the diode D1 and the ground terminal.

The primary and secondary sides of the tapped inductor T have opposite polarities. On the other hand, the tapped inductor T may be referred to as a switching transformer.

The switching element S1 in the converter unit 530 may be turned on/off based on the converter switching control signal from the controller 550. Thereby, level-converted DC power may be output.

The inverter unit 540 may convert the DC power converted by the converter unit 530 into AC power.

In the drawing, a full-bridge inverter is by example is shown. Namely, an upper-arm switching element Sa, Sb is connected to a lower-arm switching element S'a, S'b in series to form one pair, and thus two pairs of upper-arm and lower-arm switching elements are connected in parallel (Sa&S'a, Sb&S'b). Each of the switching elements Sa, S'a, Sb, S'b is connected with a diode in reverse parallel.

The switching elements in the inverter 540 may be turned on/off based on an inverter switching control signal from the controller 550. Thereby, an AC voltage having a predetermined frequency may be output. Preferably, the predetermined frequency is the same as the AC frequency of the grid (about 60 Hz or 50 Hz).

Meanwhile, the capacitor C may be disposed between the converter unit 530 and the inverter unit 540.

The capacitor C may store the level-converted DC power of the converter unit 530. Both ends of the capacitor C may be referred to as DC links, and accordingly the capacitor C may be referred to as a DC-link capacitor.

The input current sensing unit A may sense the input current ic1 supplied from the solar cell module 100 to the capacitor unit 520.

The input voltage sensing unit B may sense an input voltage Vc1 supplied from the solar cell module 100 to the capacitor unit 520. Here, the input voltage Vc1 may be equal to the voltage stored in the capacitor unit 520.

The sensed input current ic1 and the sensed input voltage vc1 may be input to the controller 550.

The converter output current detector C detects an output current ic2 output from the converter unit 530, i.e., the dc link current, and the converter output voltage detector D detects an output voltage vc2, i.e., the dc link voltage output from the converter unit 530. The detected output current ic2 and the detected output voltage vc2 may be input to the controller 550.

The inverter output current detector E detects the current ic3 output from the inverter unit 540 and the inverter output voltage detector F detects the voltage vc3 output from the inverter unit 540. The detected current ic3 and voltage vc3 are input to the controller 550.

Meanwhile, the controller 550 may output a control signal for controlling the switching element S1 of the converter unit 530. In particular, the controller 550 may output a turn-on timing signal of the switching element S1 in the converter unit 530 based on at least one of the input current ic1, the input voltage vc1, the output current ic2, the output voltage vc2, the output current ic3 and the output voltage vc3.

The controller 550 may output an inverter control signal for controlling each of the switching elements Sa, S'a, Sb, S'b of the inverter unit 540. In particular, the controller 550 may output a turn-on timing signal for each of the switching elements Sa, S'a, Sb and S'b of the inverter unit 540 based on at least one of the detected input current ic1, the input voltage vc1, the output current ic2, the output voltage vc2, the output current ic3, and the output voltage vc3.

The controller 550 may calculate the maximum power point for the solar cell module 100 and correspondingly control the converter unit 530 to output DC power corresponding to the maximum power.

The memory 590 may store data necessary for operation of the controller 500.

Specifically, the memory 590 may store firmware.

The communication unit 580 may include an IR receiver 582 and a light output unit 583 for IR communication and optical communication with the terminal 300 as illustrated in FIG. 2 or 3.

The IR receiver 582 may receive a data transmission request from the external terminal 300, and the light output unit 583 may transmit data corresponding to the data transmission request using output light.

Figure 6:
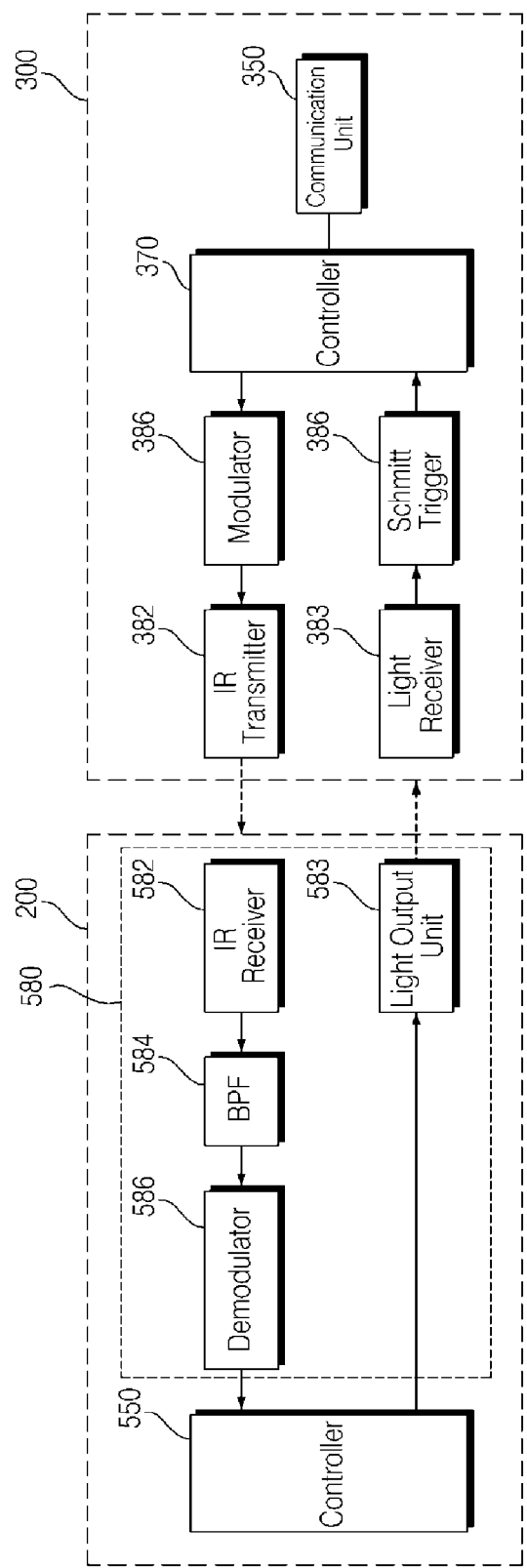
FIG. 6 is a schematic internal block diagram illustrating the photovoltaic module and the terminal of FIG. 3.

FIG. 6 is a schematic internal block diagram illustrating the photovoltaic module and the terminal of FIG. 3, and FIGS. 7A to 7C are reference diagrams illustrating operation of the photovoltaic module and the terminal of FIG. 6.

The junction box 200 in the photovoltaic module 50 may include a controller 550 and a communication unit 580.

The communication unit 580 may include an IR receiver 582 for receiving an IR signal from the terminal 300, a filter unit 584 for filtering the received signal from the IR receiver 582, a demodulator 586 for demodulating the filtered received signal, and a light output unit 583.

The demodulator 586 may separate the received signal from the carrier frequency of several tens of kHz. By using the carrier frequency, the noise immunity of the IR signal may be enhanced.

The filter unit 584 may include a bandpass filter (BPF). By using the bandpass filter, the gain of the received signal may be improved.

Operation of the light output unit 583 may be divided into a data communication mode and an operation state mode.

For example, when the light output unit 583 is in the operation state mode, the light output unit 583 may output lights of different colors to display the operation state of the photovoltaic module 50. Specifically, the light output unit 583 may output orange light, green light, and red light, respectively, when the photovoltaic module 50 is in a power generation standby, power generation, or fault state.

Figure 7A:
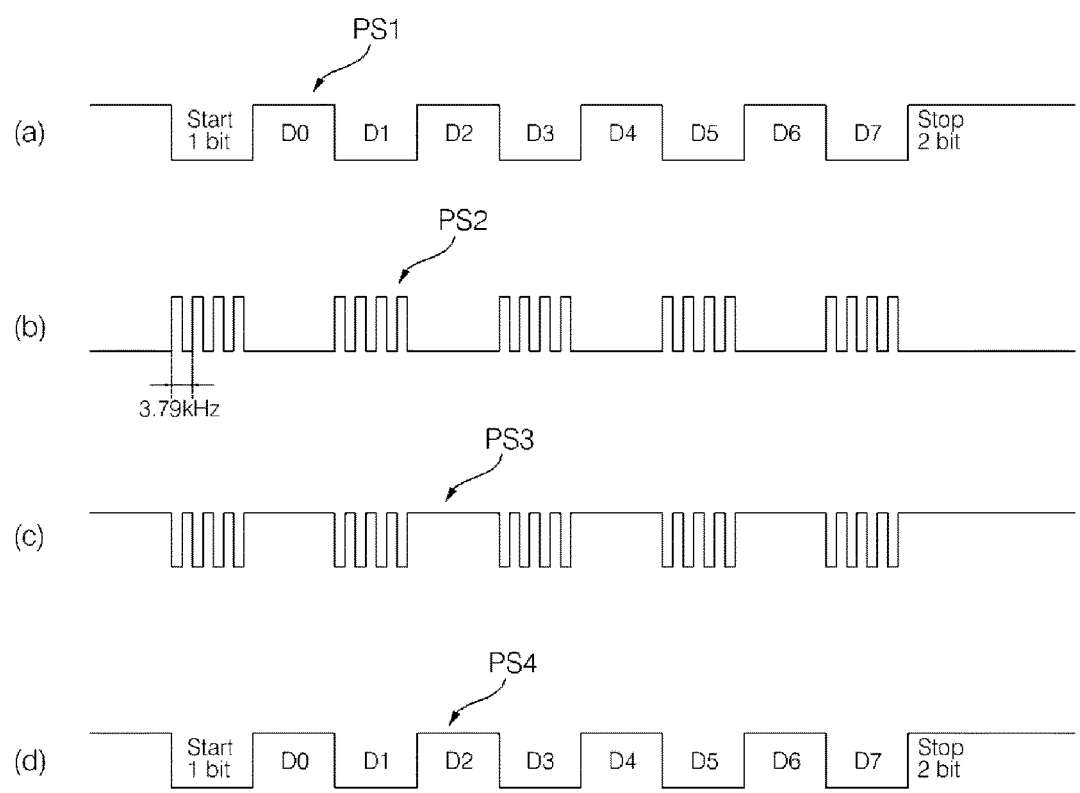
FIGS. 7A to 7C are reference diagrams illustrating operation of the photovoltaic module and the terminal of FIG. 6.
Figure 7B:
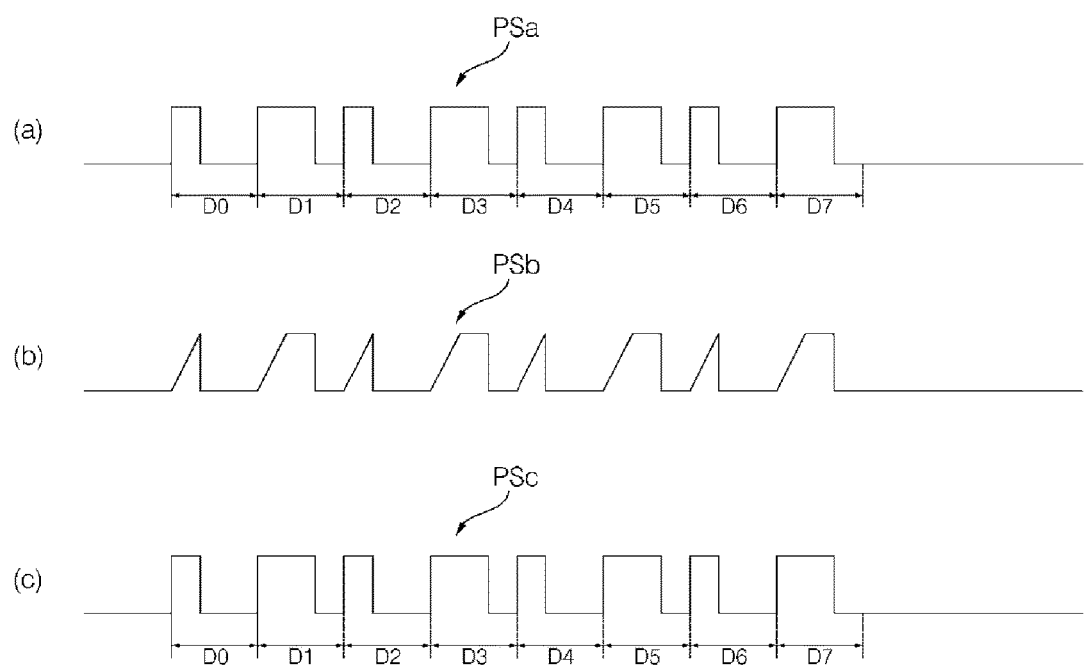
Figure 7C:
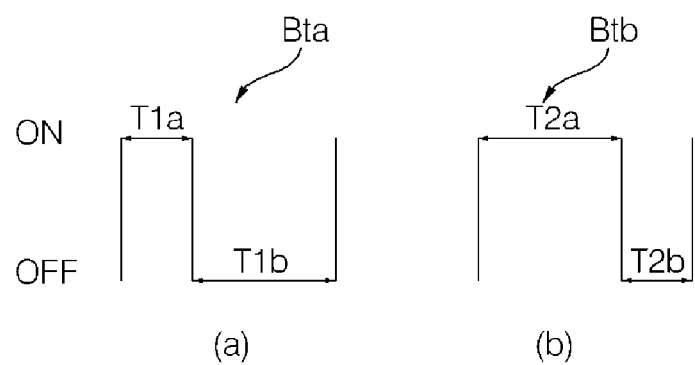

When the light output unit 583 is in the data communication mode, the light output unit 583 may transmit data based on the turn-on time and the turn-off time of the light emitting diode (LED) as shown in FIG. 7C.

In FIG. 7C, (a) illustrates that the LED is turned on during a period T1$a$ and is turned off during a period T1$b$ that is longer than the period T1$a$. In FIG. 7C, (b) illustrates that the LED is turned on during a period T2$a$ and is turned off during a period T2$b$ that is shorter than the period T2$a$.

In FIG. 7C, (a) may represent bit data '1', and in FIG. 7C, (b) may represent bit data '0'.

The light output unit 583 may convert the data to be transmitted into binary data by combining the pattern of (a) of FIG. 7C and the pattern of (b) of FIG. 7C and then transmit the data.

The terminal 300, which serves to perform IR communication and optical communication with the photovoltaic module 50, may include an IR transmitter 382 for IR transmission, a light receiver 383 for receiving light from a light output unit 583 of the photovoltaic module 50, a controller 370, and a communication unit 350.

The light receiver 383 may include an illuminance sensor.

The terminal 300 may further include a modulator 386 for modulating a signal from the controller 370 and a pulse output unit 386 for outputting a pulse from a signal waveform output from the light receiver 383.

In FIG. 7A, (a) shows an example of a transmission signal PS1 output from the controller 370. In FIG. 7A, (b) shows an example of a modulation signal PS2 output from the modulator 386. In FIG. 7A, (c) shows an example of a reception signal PS3 output from the IR receiver 582. In FIG. 7A, (d) shows an example of a reception signal PS4 output from the demodulator 586 and input to the controller 550.

The transmission signal PS1 of (a) of FIG. 7A and the reception signal PS4 of (d) of FIG. 7A may be UART communication based signals, and the modulation signal PS2 of (b) of FIG. 7A and the reception signal PS3 of (c) of FIG. 7A may be IR communication based signals.

In FIG. 7B, (a) shows an example of a transmission signal PSa output from the controller 550 and input to the light output unit 583. In FIG. 7B, (b) shows an example of a reception signal PSb output from the light receiver 383. In FIG. 7B, (c) shows an example of a reception signal PSc output from the pulse output unit 386.

When a reception signal is output based on the received light input to the light receiver 383, the reception signal PSb appears in the form of a triangle wave due to a time delay or the like, as shown in the figure.

Thus, the pulse output unit 386 discriminates the high/low level of the reception signal PSb in the form of a triangle wave, and outputs a pulse identical to the reception signal PSc3.

To this end, the pulse output unit 386 may include a Schmitt trigger.

When a data transmission request is received from the terminal 300 through the IR receiver 582 while the terminal 300 is positioned near a first area Ar1 in the photovoltaic module 50, the controller 550 may perform a control operation to transmit data corresponding to the data transmission request.

The controller 550 may control the operation of the inverter unit 540 based on the output current and the output voltage of the inverter unit 540.

When the controller 550 receives a request for transmission of the power information on the photovoltaic module 50 via the IR receiver 582, the controller 550 may perform a control operation to transmit at least one of the output current information on the inverter unit 540, the output voltage information on the inverter unit 540, the output power information on the photovoltaic module 50, frequency information on the AC power output from the inverter unit 540, and fault status information through the light output unit 583.

When firmware update information is received through the IR receiver 582, the controller 550 may update the firmware stored in the memory 590, using the firmware update information.

The controller 550 may perform a control operation based on the turn-on time and the turn-off time of the light output unit 583 to transmit data.

Figure 8:
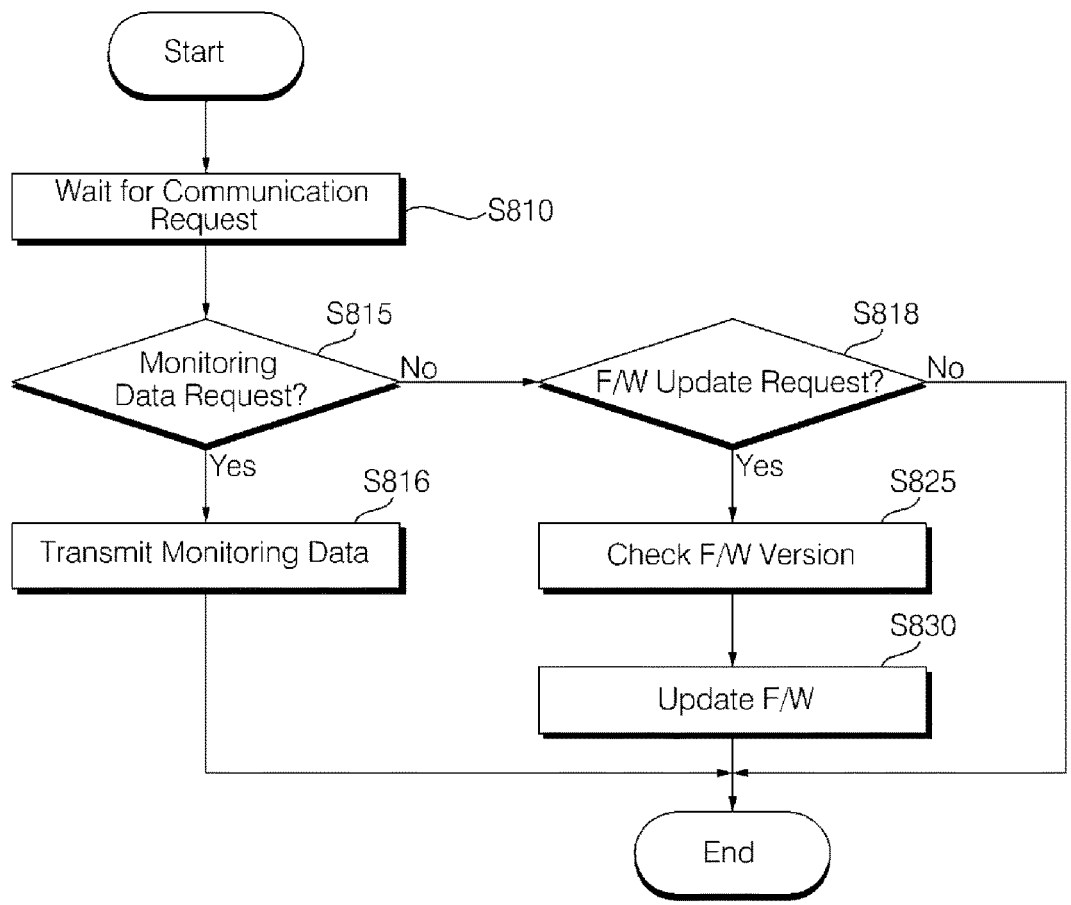
FIG. 8 is a flowchart illustrating an operation method of the photovoltaic module of FIG. 6.

FIG. 8 is a flowchart illustrating an operation method of the photovoltaic module of FIG. 6.

Referring to FIG. 6, the controller 550 in the photovoltaic module 50 maintains a communication request awaiting state (S810).

In order to receive an IR signal from the terminal 300, the controller 550 in the photovoltaic module 50 controls the IR receiver 582 or the like enter the standby mode.

Next, the controller 550 in the photovoltaic module 50 determines whether the request is a monitoring data request when an IR signal is received through the IR receiver 582 (S815).

If the request is a monitoring data request, the controller 550 in the photovoltaic module 50 performs a control operation to transmit the monitoring data stored in the memory 590 or the like through the light output unit 583 (S816).

Here, the monitoring data may include at least one of output current information, output voltage information, output power information on the photovoltaic module 50, frequency information on the AC power output from the inverter unit 540, and fault status information.

If the signal received through the IR receiver 582 is not a monitoring data request in step S815, step S818 may be performed.

That is, the controller 550 in the photovoltaic module 50 may determine whether the signal received through the IR receiver 582 is a firmware update request when the signal is not a monitoring data request (S818).

If the signal received through the IR receiver 582 is the firmware update request, the controller 550 in the photovoltaic module 50 receives and demodulates the received firmware update data, and checks the version of the firmware stored in the memory 590 (S825).

Then, if it is necessary to update the firmware stored in the memory 590, the controller 550 in the photovoltaic module 50 performs a control operation to update the firmware stored in the memory 590 using the received firmware update data.

When the firmware is updated, the controller 590 may be reset and initialized.

Figure 9A:
FIGS. 9A and 9B illustrate an operation method of the photovoltaic module and the terminal of FIG. 6.
Figure 9B:
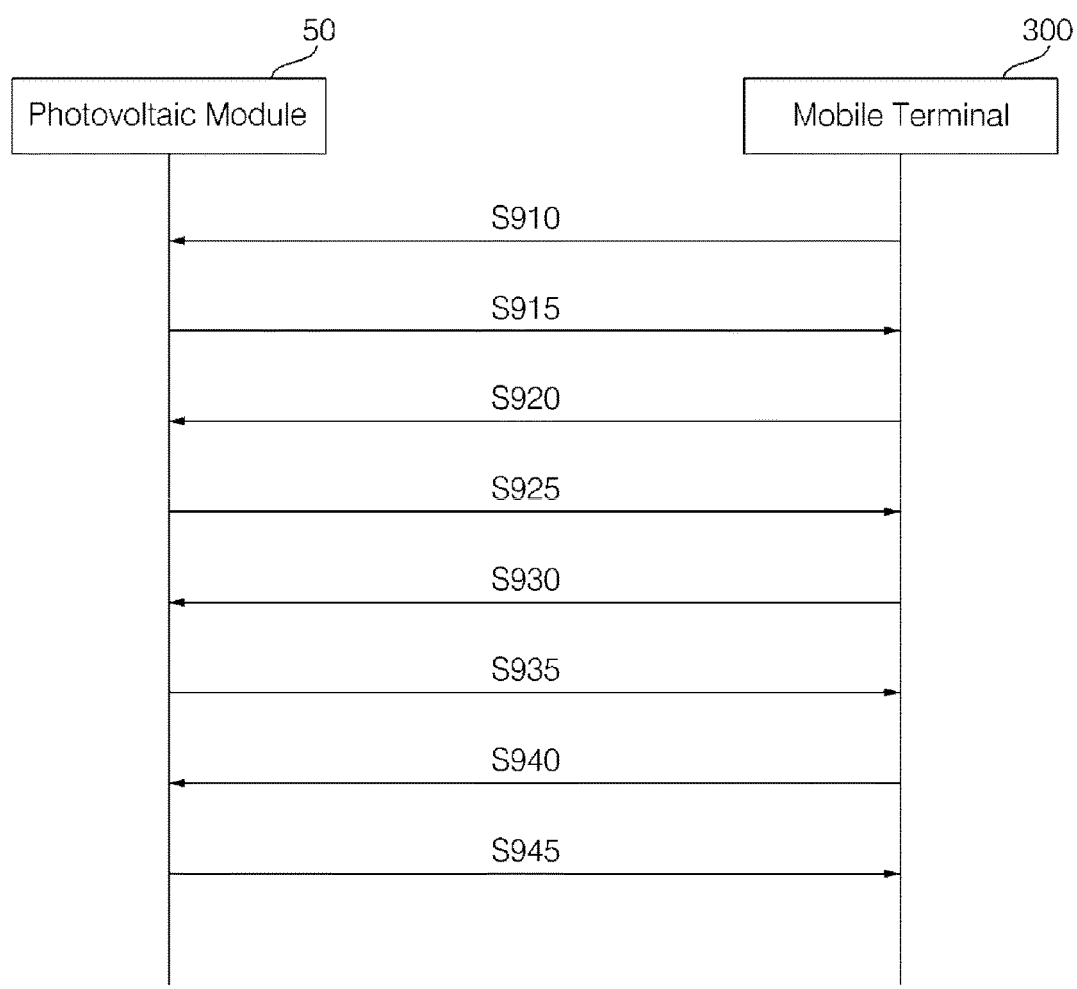

FIGS. 9A and 9B illustrate an operation method of the photovoltaic module and the terminal of FIG. 6.

First, FIG. 9A is a reference diagram for explaining a monitoring data request, for example, a power information transmission request.

The terminal 300 may transmit a power information transmission request to the photovoltaic module 50 through an IR signal (S901).

The photovoltaic module 50 may transmit power information transmission data through optical output in response to the power information transmission request (S902).

For example, the power information transmission data may include at least one of the output current information on the inverter unit 540, the output voltage information on the inverter unit 540, the output power information on the photovoltaic module 50, frequency information on the AC power output from the inverter unit 540, and fault status information.

Next, FIG. 9B shows signal flow between the terminal and the photovoltaic module for firmware update.

First, the terminal 300 transmits a firmware update preparation request through the IR transmitter 382 (S910).

The IR receiver 582 of the photovoltaic module 50 receives this request and the light output unit 583 of the photovoltaic module 50 transmits a firmware update preparation completion response (S920).

Next, the terminal 300 transmits a data deletion request for a specific area in the memory 590 (S930).

The IR receiver 582 of the photovoltaic module 50 receives this request and the light output unit 583 of the photovoltaic module 50 transmits a data deletion completion response for the specific area in the memory 590 (S940).

Next, the terminal 300 transmits firmware data and checksum data through the IR transmitter 382 (S950).

The IR receiver 582 of the photovoltaic module 50 receives the data and the light output unit 583 of the photovoltaic module 50 transmits error status information based on the checksum data (S960).

Next, the terminal 300 transmits a firmware update termination request through the IR transmission unit 382 (S970).

The IR receiver 582 of the photovoltaic module 50 receives the request and the light output unit 583 of the photovoltaic module 50 transmits a firmware update termination response upon completing the firmware update (S980).

According to this process, the firmware update may be stably performed, and the terminal 300 and even the server 400 or the gateway 80 may recognize completion of firmware update in the photovoltaic module 50.

Meanwhile, the operation power for operation in the power line communication unit 4 of FIG. 1 should be supplied from the gateway 9 and the inverter 8, respectively, and relatively high power consumption occurs in the power line communication unit. Thereby, conversion efficiency of the inverter is reduced.

In the present invention, in order to address this issue, an IR communication scheme in which power consumption is lowered and manufacturing costs are reduced is employed.

Particularly, a photovoltaic system includes a photovoltaic module for supplying AC power and a gateway, and IR communication is performed between the photovoltaic module and the gateway and between a plurality of photovoltaic modules. Details will be described with reference to FIG. 10A and subsequent figures.

Figure 10A:
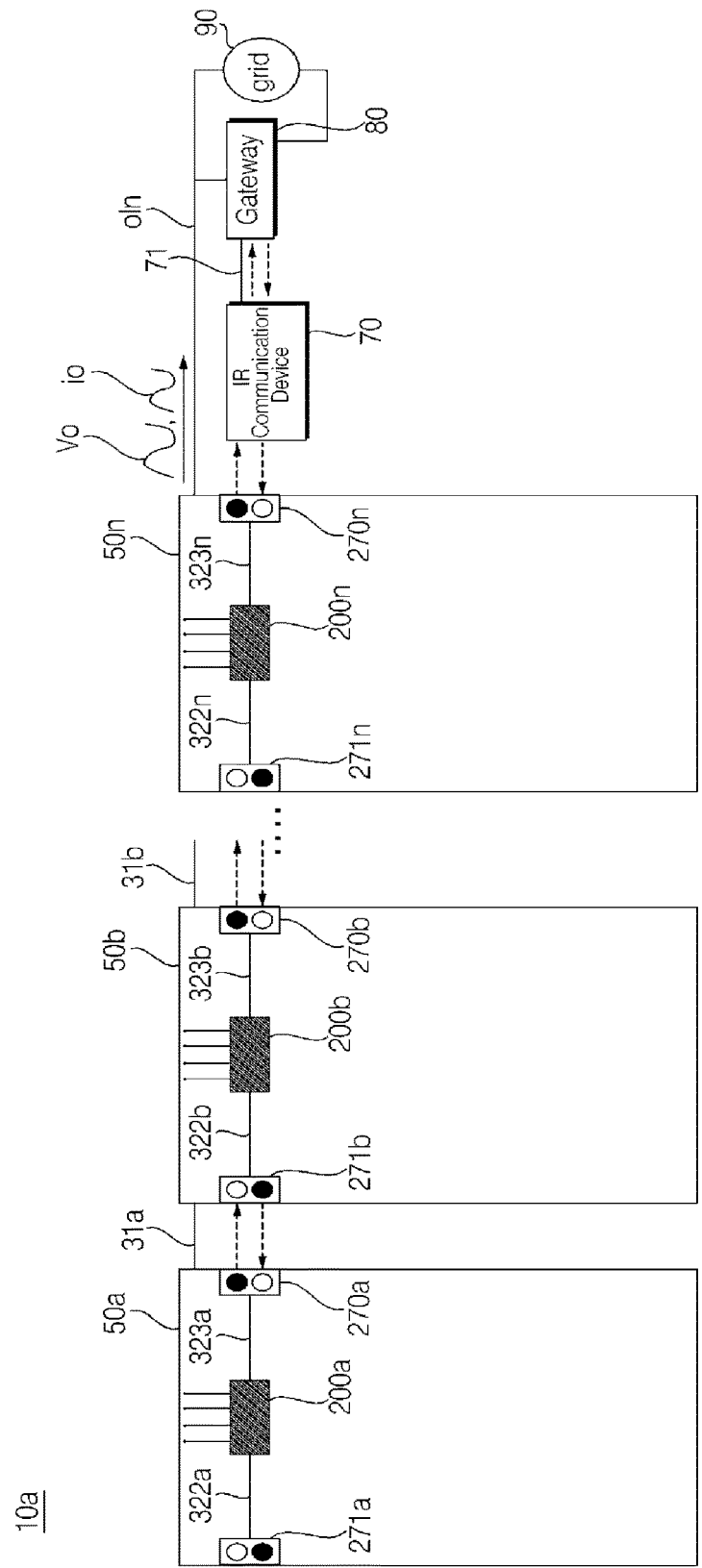
FIG. 10A is a view illustrating a photovoltaic system according to an embodiment of the present invention.

FIG. 10A is a view illustrating a photovoltaic system according to an embodiment of the present invention.

Referring to FIG. 10A, a photovoltaic system 10*a* according to an embodiment of the present invention may include a plurality of photovoltaic modules 50*a* to 50*n*, an IR communication device 70, a gateway 80, and a grid 90.

Each of the photovoltaic modules 50*a* to 50*n* may output AC power to the grid 90 and may output power generation information by IR communication.

The IR communication device 70 may receive the power generation information from the photovoltaic modules 50*a* to 50*n* by IR communication.

The gateway 80 may receive the generation information and the ID information on the photovoltaic modules 50*a* to 50*n* from the IR communication device 70 based on wired or wireless communication other than IR communication.

Particularly, in the present invention, the gateway 80 uses IR communication instead of power line communication in monitoring the photovoltaic modules 50*a* to 50*n* that output the AC power.

To this end, each of the photovoltaic modules 50*a* to 50*n* preferably includes an IR communication unit 270*a* to 270*n* and a second IR communication unit 271*a* to 271*n*.

In addition, the IR communication device 70 is preferably disposed between the photovoltaic modules 50*a* to 50*n* and the gateway 80.

As a result, power consumption may be reduced compared to the instance of using power line communication, and further, manufacturing costs may be reduced.

Each of the photovoltaic modules 50*a* to 50*n* may include a solar cell module 100 having a plurality of solar cells, an inverter unit 540 for outputting AC power converted based on DC power from the solar cell module 100, a cable 31 for outputting the AC power from the inverter unit 540, an IR communication unit 270*a* to 270*n* for transmitting at least one of the voltage information on the solar cell module 100, the current information on the solar cell module 100, the voltage information on the inverter unit 540, and the current information on the inverter unit 540 to an adjacent first photovoltaic module 50*a* to 50*n*, the external gateway 80, or the external IR communication device 70, a second IR communication unit 271a to 271n for receiving voltage information on a solar cell module in a second photovoltaic module 50a to 50n adjacent to an opposite side of the first photovoltaic module 50a to 50n current information on the solar cell module 100 in the second photovoltaic module 50a to 50n, voltage information on an inverter unit 540 in the second photovoltaic module 50a to 50n, and current information on the inverter unit 540 in the second photovoltaic module 50a to 50n.

In the figure, the photovoltaic modules 50a to 50n are illustrated as including a first photovoltaic module 50a, a second photovoltaic module 50b, and an n-th photovoltaic module 50n which are arranged in a row.

It is by example shown that a junction box 200a having circuit parts for receiving DC power from the solar cell modules and performing power conversion is disposed on the back surface of the first photovoltaic module 50a.

It is by example shown that the second IR communication unit 271a is disposed on the back surface of the first photovoltaic module 50a, particularly, on the left side thereof, and the first IR communication portion 270a is disposed on the right side thereof.

Particularly, the second IR communication unit 271a, the first IR communication unit 270a, and the junction box 200a are preferably arranged in a row. Thereby, the cable between the junction box 200a and the second IR communication unit 271a and the cable between the junction box 200a and the first IR communication unit 270a may be shortened, and thus signal noise may be attenuated.

Similarly, the junction box 200b may be disposed on the back surface of the second photovoltaic module 50b, and the second IR communication unit 271b and the first IR communication unit 270b may be disposed on both sides of the junction box 200b.

Similarly, the junction box 200n may disposed on the back surface of the n-th photovoltaic module 50n, and the second IR communication unit 271n and the first IR communication unit 270n may be disposed on both sides of the junction box 200n.

The IR communication unit 270a of the first photovoltaic module 50a may perform IR communication with the second IR communication unit 271b of the adjacent second photovoltaic module 50b.

The IR transmitter 270a may transmit the power generation information and the ID information on the first photovoltaic module 50a to the second IR communication unit 271b of the second photovoltaic module 50b.

Specifically, the IR transmitter 270a transmits at least one of the voltage information and current information on the first solar cell module 100a in the first solar cell module 50a and the voltage information and current information on the inverter unit 540a in the first solar cell module 50a to the second IR communication unit 271b of the second photovoltaic module 50b.

Similarly, although not shown, the IR communication unit 270b of the second photovoltaic module 50b may perform IR communication with the second IR communication unit 271c of the third photovoltaic module 50c.

The IR transmitter 270b may transmit the power generation information and ID information on the first photovoltaic module 50a, received from the first photovoltaic module 50a, to the third IR communication unit 271c of the third photovoltaic module 50c.

Specifically, the IR transmitter 270b may transmit at least one of the voltage information and current information on the first solar cell module 100a in the first photovoltaic module 50a and the voltage information and current information on the inverter unit 540a in the first photovoltaic module 50a to the third IR communication unit 271c of the third photovoltaic module 50c.

The IR transmitter 270b may transmit the power generation information and ID information on the second photovoltaic module 50b to the second IR communication unit 271c of the third photovoltaic module 50c.

Specifically, the IR transmitter 270b may transmit at least one of the voltage information on the second solar cell module 100b in the second solar cell module 50b, the current information on the second solar cell module 100b, the voltage information on the inverter unit 540b in the second solar cell module 50b, and the current information on the inverter unit 540b to the third IR communication unit 271c of the third photovoltaic module 50c.

Similarly, the IR communication unit 270n of the n-th photovoltaic module 50n may perform IR communication with the adjacent IR communication device 70.

By such IR communication, the IR communication device 70 may receive both the power generation information and the ID information from the plurality of photovoltaic modules 50a to 50n.

In particular, the IR communication device 70 may receive both the power generation information and the ID information from the plurality of photovoltaic modules 50a to 50n through daisy-chain IR communication.

The IR communication device 70 may exchange data with the gateway 80 by wired communication such as PLC, or wireless communication using Wi-Fi, ZigBee or Bluetooth.

In particular, the IR communication device 70 may transmit the power generation information and the ID information from the plurality of photovoltaic modules 50a to 50n to the gateway 80.

The IR communication device 70 may be installed around the plurality of photovoltaic modules 50a to 50n, for example, on the roof or outer wall of a building.

The gateway 80 may be installed inside a building.

Thus, the gateway 80 installed inside the building may easily recognize the power generation information and the ID information from the plurality of photovoltaic modules 50a to 50n.

Particularly, when wired power line communication is performed between the IR communication device 70 and the gateway 80, only one cable needs to be disposed between the IR communication device 70 and the gateway 80. Therefore, installation may be simple and manufacturing costs may be reduced.

Figure 10B:
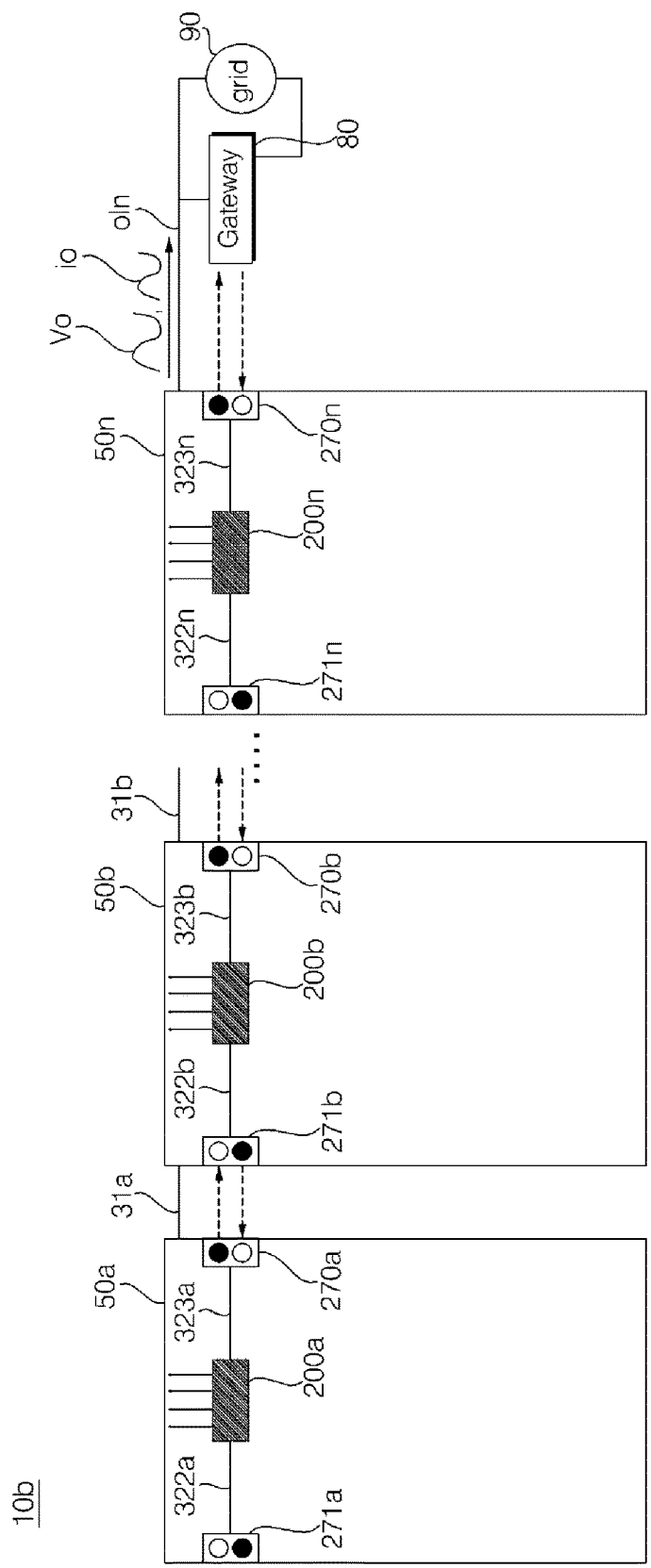
FIG. 10B is an enlarged view of the photovoltaic module and the IR communication device of FIG. 10A.

FIG. 10B is an enlarged view of the photovoltaic module and the IR communication device of FIG. 10A.

Referring to FIG. 10B, the photovoltaic module 50 may include a microcomputer 1580 for outputting a signal for IR communication or receiving an IR signal, an IR communication unit 270, and a second IR communication unit 271.

Meanwhile, the IR communication device 70 may include a microcomputer 75 for outputting a signal for IR communication or receiving an IR signal and IR communication units 71 and 72.

The gateway 80 may include a microcomputer 85 for outputting a signal for performing wired or wireless communication. Although not shown in the figure, it may further include a communication unit.

The IR communication device 70 may further include a communication unit for wired or wireless communication with the gateway 80.

The IR communication unit 270 in the photovoltaic module 50 may include an IR transmitter 270t and an IR receiver 270r, and the second IR communication unit 271 may include an IR transmitter 271t and an IR receiver 271r.

The IR transmitter 270t in the IR communication unit 270 may output power generation information and ID information via an IR signal, and the IR receiver 71b in the IR communication unit 71 in the IR communication unit 70 may receive the IR signal containing the power generation information and ID information on the photovoltaic module 50.

The power generation information may include at least one of the voltage information on the solar cell module 100, the current information on the solar cell module 100, the voltage information on the inverter unit 540, and the current information on the inverter unit 540.

Accordingly, the IR transmitter 270t may output at least one of the voltage information on the solar cell module 100, the current information on the solar cell module 100, the voltage information on the inverter unit 540, and the current information on the inverter unit 540 to the IR communication device 70.

The microcomputer 75 may extract the power generation information and the ID information on the photovoltaic module from the IR signal and convert the same into a communication signal for wired or wireless communication.

Thus, the IR communication device 70 may transmit the communication signal containing the power generation information and the ID information to the gateway 80, and the microcomputer 85 in the gateway 80 may extract the power generation information and the ID information from the received communication signal and check the power generation information and ID information on the photovoltaic module 50.

The gateway 80 may output a scan signal for scanning the photovoltaic module. The scan signal may be transmitted to the IR communication device 70 by wired or wireless communication and the microcomputer 75 of the IR communication device 70 may output a scan signal.

The IR transmitter 71a in the IR communication unit 71 in the IR communication device 70 may transmit an IR signal including the scan signal. Accordingly, the IR receiver 270b in the IR communication unit 270 in the photovoltaic module 50 receives the IR signal including the scan signal.

The microcomputer 1580 may extract the scan signal from the IR signal and output a response signal containing ID information in response to the scan signal.

Thus, the IR transmitter 270a in the IR communication unit 270 in the photovoltaic module 50 transmits an IR signal including the response signal.

The IR transmitter 270t in the IR communication unit 270 may output a response signal in response to the IR signal, and accordingly the IR receiver 71b in the IR communication unit 71 in the IR communication device 70 may receive the IR signal including the response signal of the photovoltaic module 50.

The microcomputer 75 may extract the response signal of the photovoltaic module 50 from the IR signal and convert the same into a communication signal for wired or wireless communication.

Thus, the IR communication device 70 may transmit the communication signal including the response signal to the gateway 80, and the microcomputer 85 in the gateway 80 may extract the ID information from the received response signal and check the ID information on the photovoltaic module 50.

Preferably, transmission and reception of the scan signal and the response signal described above precede transmission and reception of the power generation information and the ID information described above.

Figure 11A:
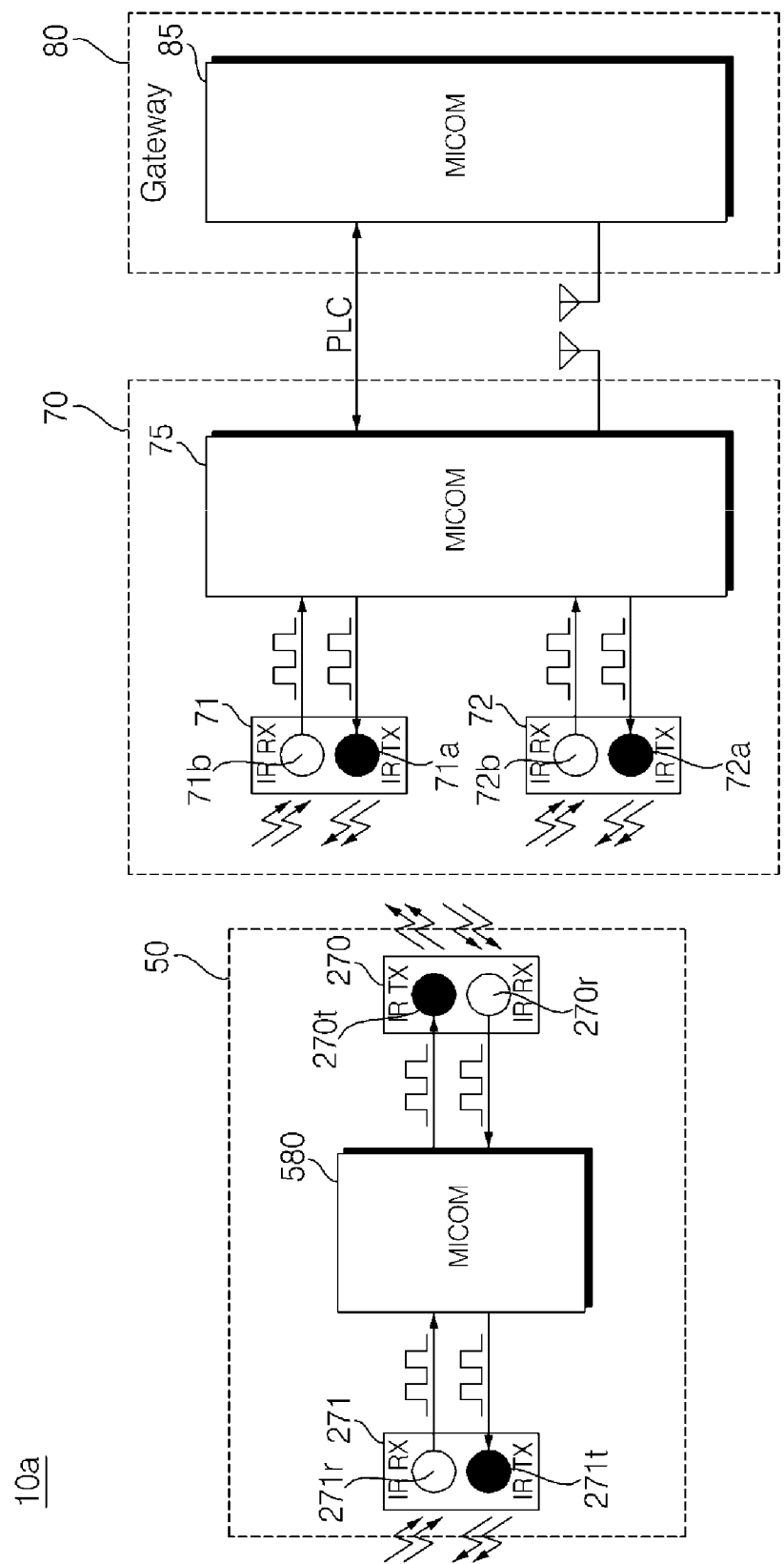
FIG. 11A is a view illustrating a photovoltaic system according to another embodiment of the present invention.

FIG. 11A is a view illustrating a photovoltaic system according to another embodiment of the present invention.

The photovoltaic system 10b of FIG. 11a is similar to the photovoltaic system 10a of FIG. 2 except that the IR photovoltaic system 10b is not provided with the IR communication device 70, and the n-th photovoltaic module 50n and the gateway 80 perform IR communication with each other.

Accordingly, the gateway 80 may include an IR communication unit.

Figure 11B:
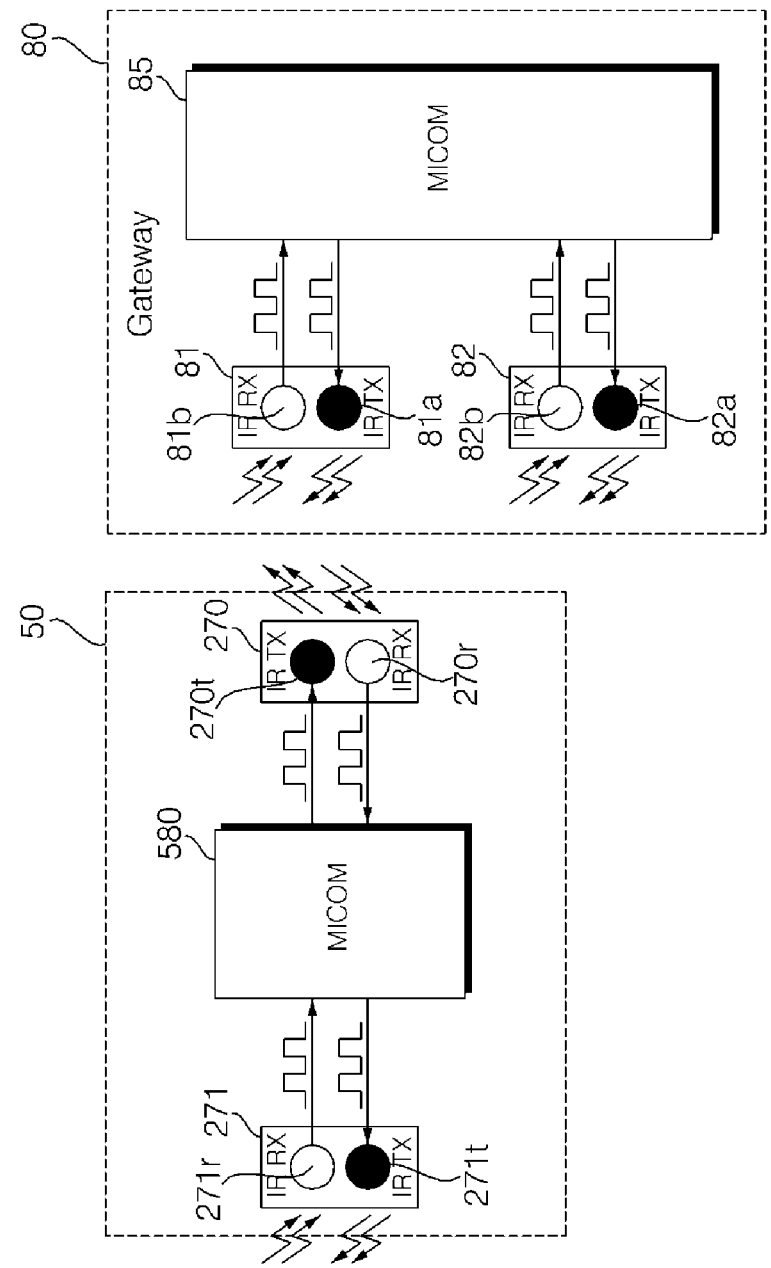
FIG. 11B is an enlarged view of the photovoltaic module and gateway of FIG. 11A.

FIG. 11B is an enlarged view of the photovoltaic module and gateway of FIG. 11A.

Referring to FIG. 11B, since the IR communication device 70 is not provided, in contrast with the example of FIG. 10B, the gateway 80 may include a microcomputer 85 and IR communication units 81 and 82.

The IR transmitter 270t in the IR communication unit 270 may output power generation information and ID information via an IR signal, and the IR receiver 71b in the IR communication unit 71 in the gateway 80 71b may receive the IR signal containing the power generation information and ID information on the photovoltaic module 50.

The power generation information may include at least one of the voltage information on the solar cell module 100, the current information on the solar cell module 100, the voltage information on the inverter unit 540, and the current information on the inverter unit 540.

Accordingly, the IR transmitter 270t may output at least one of the voltage information on the solar cell module 100, the current information on the solar cell module 100, the voltage information on the inverter unit 540, and the current information on the inverter unit 540 to the gateway 80.

The microcomputer 85 in the gateway 80 may extract the power generation information and the ID information on the photovoltaic module 50 from the IR signal and check the extracted power generation information and ID information.

The microcomputer 85 of the gateway 80 may output a scan signal for scanning the photovoltaic module.

The IR transmitter 81a in the IR communication unit 81 in the gateway 80 may transmit an IR signal including the scan signal. Accordingly, the IR receiver 270b in the IR communication unit 270 in the photovoltaic module 50 receives the IR signal including the scan signal.

The microcomputer 1580 may extract the scan signal from the IR signal and output a response signal containing ID information in response to the scan signal.

Thus, the IR transmitter 270a in the IR communication unit 270 in the photovoltaic module 50 transmits an IR signal including the response signal.

The IR transmitter 270t in the IR communication unit 270 may output a response signal in response to the IR signal, and accordingly the IR receiver 81b in the IR communication unit 81 in the gateway 80 may receive the IR signal including the response signal of the photovoltaic module 50.

The microcomputer 85 may extract the response signal of the photovoltaic module 50 from the IR signal, extract the ID information from the response signal, and check the ID information on the photovoltaic module 50.

Figure 12:
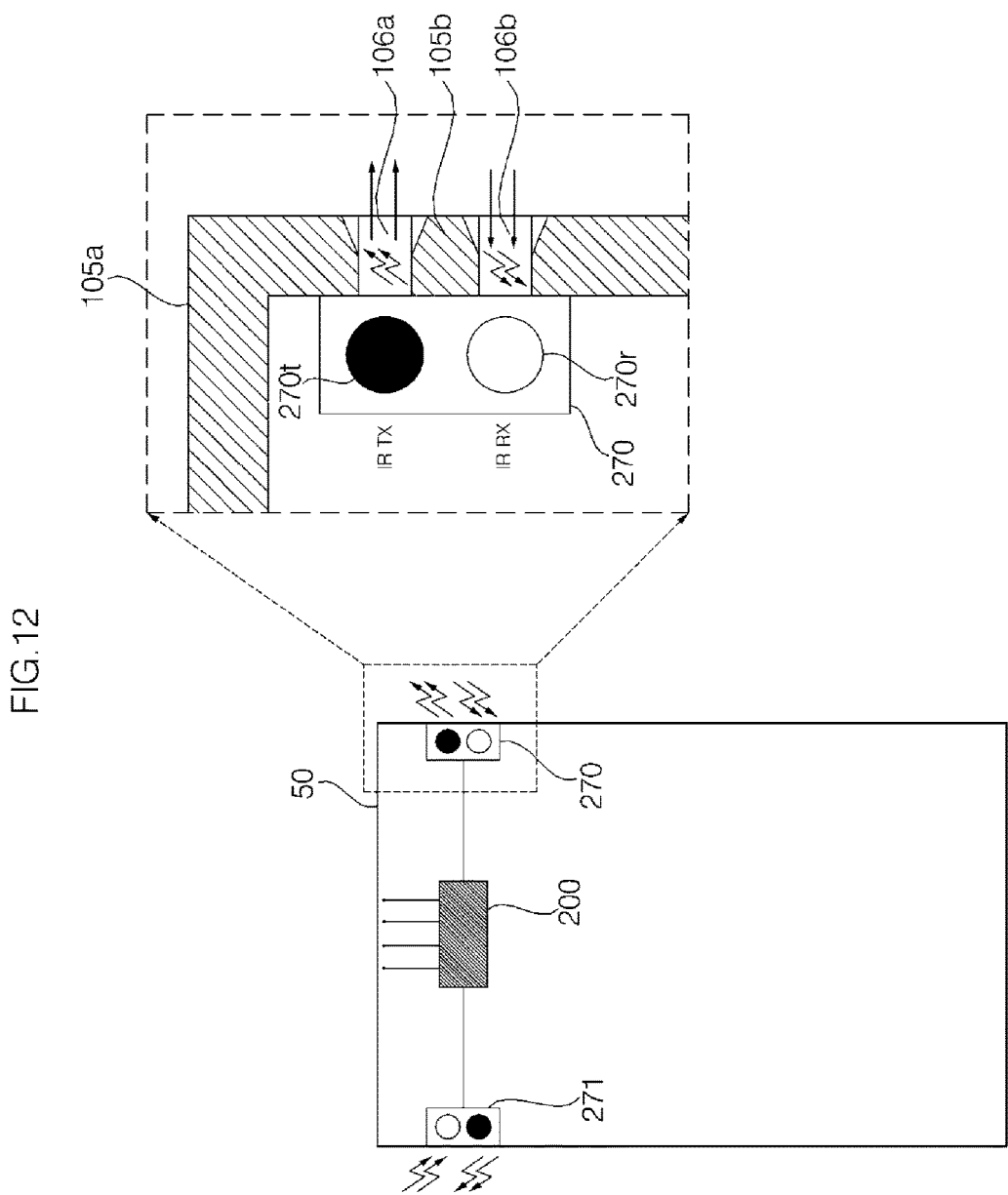
FIG. 12 is a partially enlarged side view of the photovoltaic module of FIG. 10A.

FIG. 12 is a partially enlarged side view of the photovoltaic module of FIG. 10A.

Referring to FIG. 12, the IR communication unit 270 and the second IR communication unit 271, which are disposed on the back surface of the photovoltaic module 50, are preferably disposed on both lateral ends of the photovoltaic modules 50a to 50n for IR communication with adjacent photovoltaic modules.

Meanwhile, the photovoltaic module 50 may further include a frame 105 surrounding the solar cell module 100.

In FIG. 12, an upper frame 105a and a right frame 105b are illustrated as parts of the frame 105.

The IR communication unit 270 and the second IR communication unit 271 may be disposed adjacent to both sides of the frame 105.

In FIG. 12, the IR communication unit 270 is disposed on the right side of the back surface of the photovoltaic module 50, and the second IR communication unit 271 is disposed on the left side of the back surface.

Preferably, an opening is formed in a side area of the frame 105 where the IR communication unit 270 and the second IR communication unit 271 are disposed.

The figure by example shows an enlarged view of the IR communication unit 270 disposed on the right side of the back surface of the photovoltaic module 50. Thus, two openings 106a and 106b corresponding to the IR transmitter 270t and the receiver 270r of the IR communication unit 270 are formed in an area in the right frame 105b.

Accordingly, in IR communication, the directivity of the IR signal is improved, and thus the signal-to-noise ratio is improved. Therefore, the accuracy of IR communication is improved.

Figure 13A:
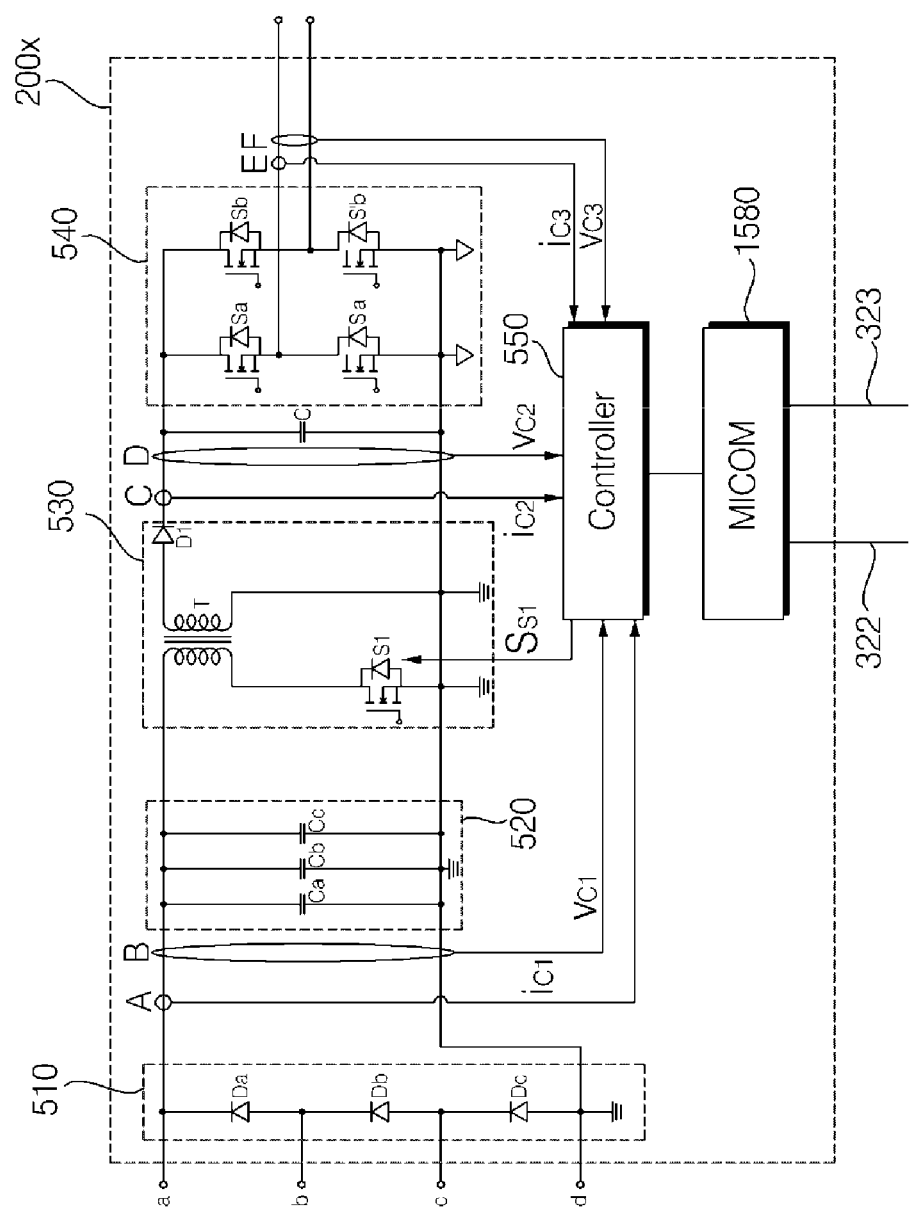
FIG. 13A is an example of an internal circuit diagram of a junction box in the photovoltaic module of FIG. 10A.

FIG. 13A is an example of an internal circuit diagram of a junction box in the photovoltaic module of FIG. 10A.

Referring to FIG. 13A, the junction box 200x of FIG. 13A is similar to the junction box 200 of FIG. 5 except that the junction box 200x further includes a microcomputer 1580 in place of the memory 590 and the communication unit 580. Hereinafter, such distinguishing feature will be mainly described.

The junction box 200x of FIG. 13A may further include a microcomputer 1580 for controlling the IR communication unit 270 and the second IR communication unit 271.

For example, when an IR signal including a scan signal is received through the IR communication unit 270, the microcomputer 1580 may extract the scan signal and transmit the extracted scan signal to the controller 550.

Then, the microcomputer 1580 may receive a response signal from the controller 550 and transmit a response signal containing the ID information to the IR communication unit 270.

In another example, when an IR signal containing power generation information and ID information on an adjacent photovoltaic module is received through the second IR communication unit 271, the microcomputer 1580 may bypass the IR signal through the IR communication unit 270.

That is, the IR signal containing the power generation information and the ID information on the adjacent photovoltaic module may be controlled to be output through the IR communication unit 270 without being processed.

The microcomputer 1580 may control its own generation information and ID information to be output through the IR communication unit 270.

Figure 13B:
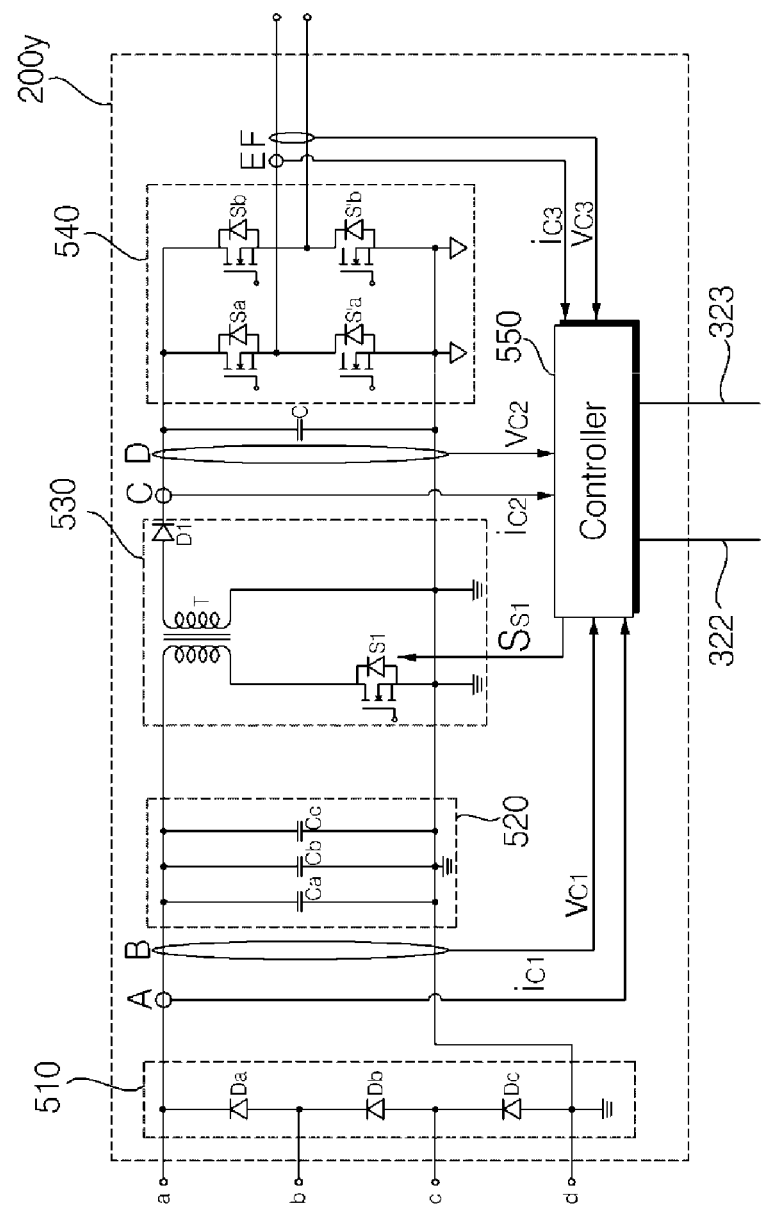
FIG. 13B is another example of an internal circuit diagram of a junction box in the photovoltaic module of FIG. 10A.

FIG. 13B is another example of an internal circuit diagram of a junction box in the photovoltaic module of FIG. 10A.

Referring to FIG. 13B, the internal circuit diagram of the junction box 200y in FIG. 13B differs from the circuit diagram of FIG. 13A in that the microcomputer 1580 is not provided.

Accordingly, the function of the microcomputer 1580 in FIG. 13A may be performed by the controller 550.

Figure 14A:
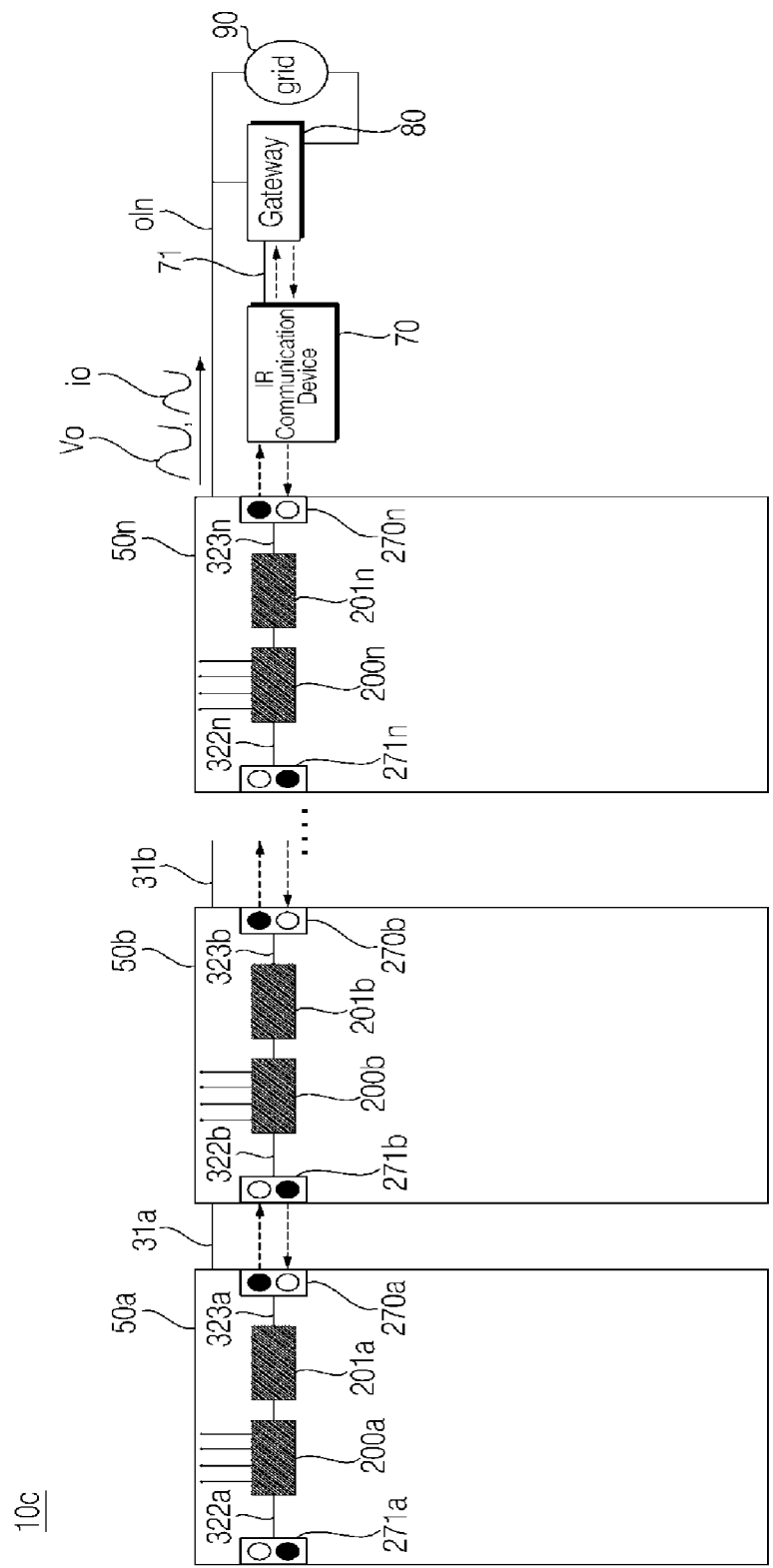
FIG. 14A is a view illustrating a photovoltaic system according to another embodiment of the present invention.

FIG. 14A is a view illustrating a photovoltaic system according to another embodiment of the present invention.

The photovoltaic system 10c of FIG. 14A is similar to the photovoltaic system 10a of FIG. 10A, except that two junction boxes are provided.

While the junction box 200 of FIG. 10A includes the diode unit 510, the capacitor unit 520, the converter unit 530, the controller 540, and the microcomputer 1580 shown in FIG. 13A, each of first junction boxes 200a to 200n of FIG. 14A has only a diode unit 510 and each of second junction boxes 201a to 201b includes a capacitor unit 520, a converter unit 530, a controller 540, and a microcomputer 1580.

The IR communication unit 270a to 270b and the second IR communication unit 271a to 271b in each photovoltaic module 50a to 50b may be disposed on both sides of the first junction box 200a to 200n and the second junction box 201a-201b.

Figure 14B:
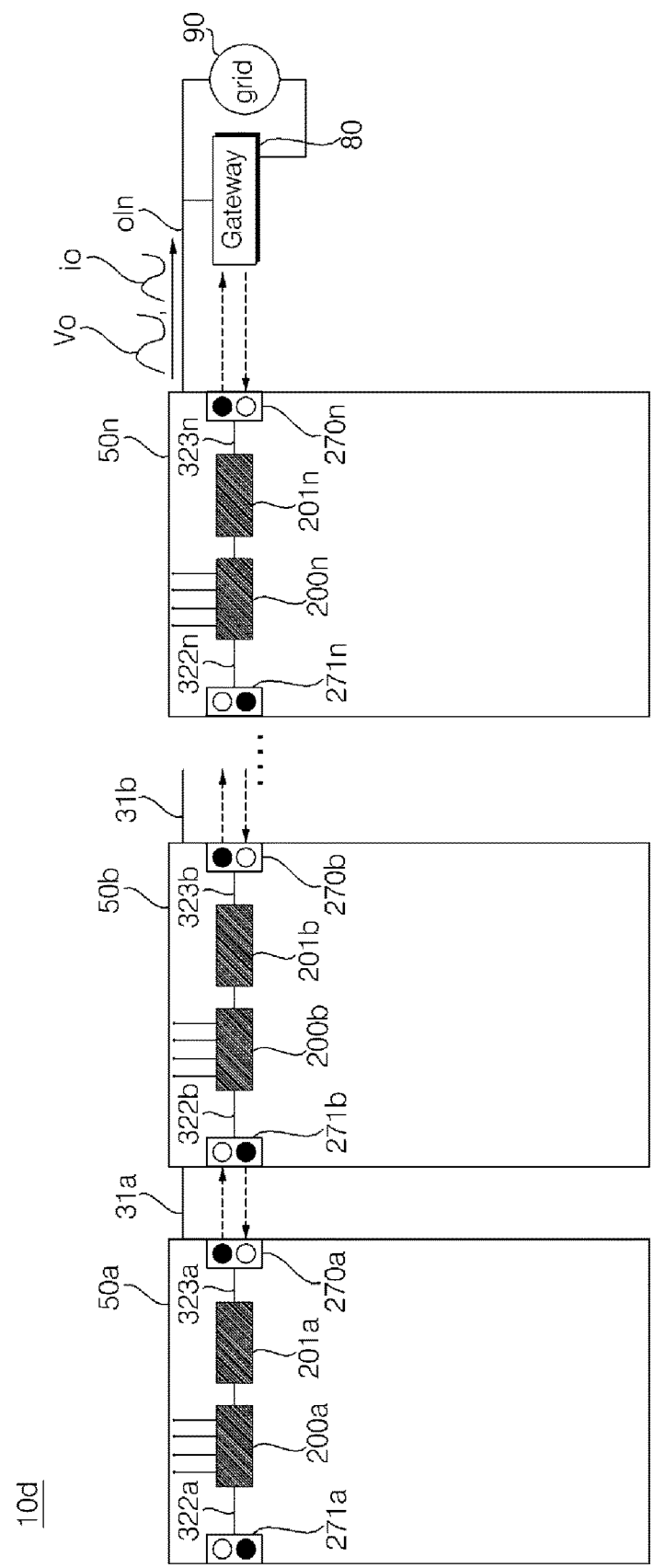
FIG. 14B is a view illustrating a photovoltaic system according to another embodiment of the present invention.

FIG. 14B is a view illustrating a photovoltaic system according to another embodiment of the present invention.

The photovoltaic system 10d of FIG. 14B is similar to the photovoltaic system 10c of FIG. 14A except that it is not provided with the IR communication device 70.

Figure 15:
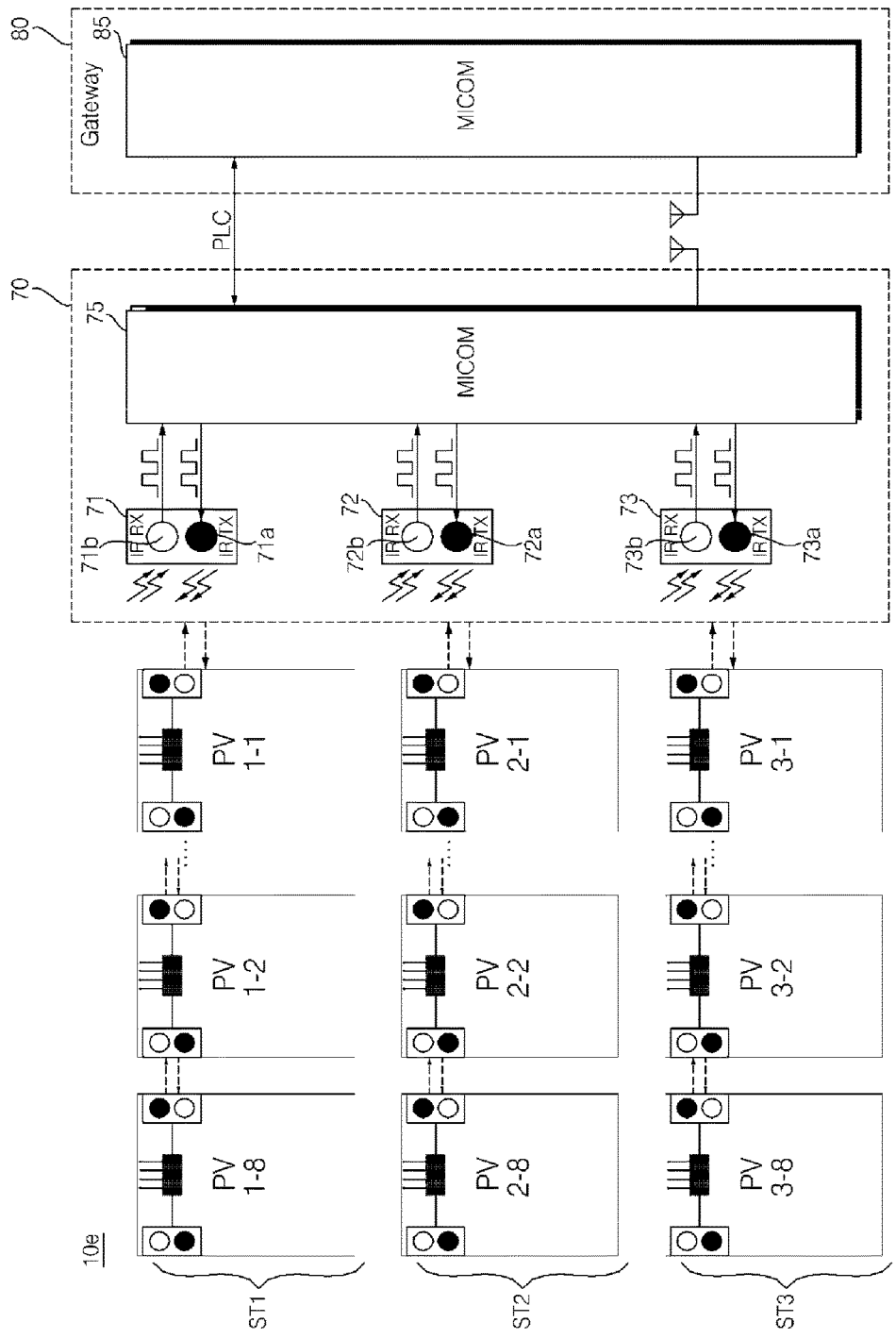
FIG. 15 is a view illustrating a photovoltaic system according to another embodiment of the present invention.

FIG. 15 is a view illustrating a photovoltaic system according to another embodiment of the present invention.

The photovoltaic system 10e of FIG. 15 is similar to the photovoltaic system 10a of FIG. 10a except that the photovoltaic modules PV1-1 to PV3-8 are arranged in a 3*n matrix.

FIG. 15 by example shows a first photovoltaic module string ST1 having photovoltaic modules PV1-1 to PV1-8, a second photovoltaic module string ST2 having photovoltaic modules PV2-1 to PV2-8, and a third photovoltaic module string ST3 having photovoltaic modules PV3-1 to PV3-8.

Accordingly, the IR communication device 70 preferably includes three IR communication units 71, 72, and 73 corresponding to the first to third strings ST1 to ST3.

Figure 16:
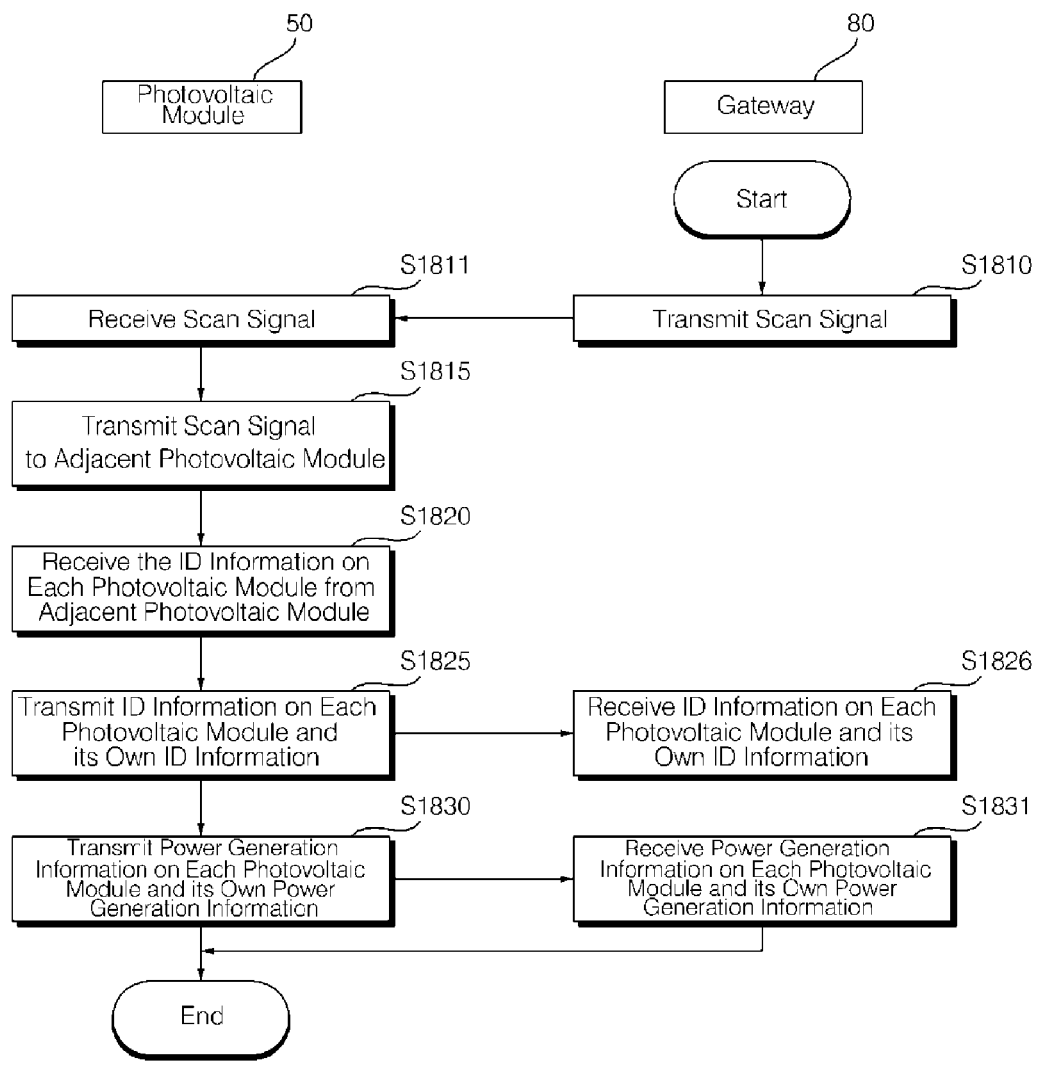
FIG. 16 is a flowchart illustrating an operation method of a photovoltaic system according to an embodiment of the present invention.

FIG. 16 is a flowchart illustrating an operation method of a photovoltaic system according to an embodiment of the present invention.

Hereinafter, the photovoltaic system 10a of FIG. 10A will be described as a reference.

Referring to FIG. 16, the gateway 80 may transmit a scan signal by wire or wirelessly to the photovoltaic module upon completion of gateway installation or periodically (S1810).

Thus, the IR communication device 70 receives the scan signal, converts the same into an IR signal, and transmits the IR signal to the photovoltaic module 50.

The photovoltaic module 50 receives a scan signal in the form of an IR signal through the IR communication unit 270 (S1811), and transmits the scan signal to an adjacent photovoltaic module through the second IR communication unit 271 (S1815).

The photovoltaic module 50 receives the ID information from each photovoltaic module including the adjacent photovoltaic module through the second IR communication unit 271 (S1820).

Then, the photovoltaic module 50 transmits the ID information on each photovoltaic module through the IR communication unit 270 (S1825).

The IR communication device 70 receives the ID information on each of the photovoltaic modules in the form of an IR signal and converts the ID information to transmit the ID information on each photovoltaic module to the gateway 80 through wired or wireless communication.

Thus, the gateway 80 receives the ID information on each photovoltaic module (S1826).

Next, the photovoltaic module 50 transmits the power generation information and the ID information on each photovoltaic module through the IR communication unit 270 (S1830).

The IR communication device 70 receives the power generation information and the ID information on each photovoltaic module in the form of an IR signal and converts the power generation information and the ID information to transmit the power generation and ID information on each photovoltaic module to the gateway 80.

Thus, the gateway 80 receives the power generation information and the ID information on each photovoltaic module (S1831).

FIGS. 17A to 18B are reference diagrams for explaining the operation method of FIG. 16.

Figure 17A:
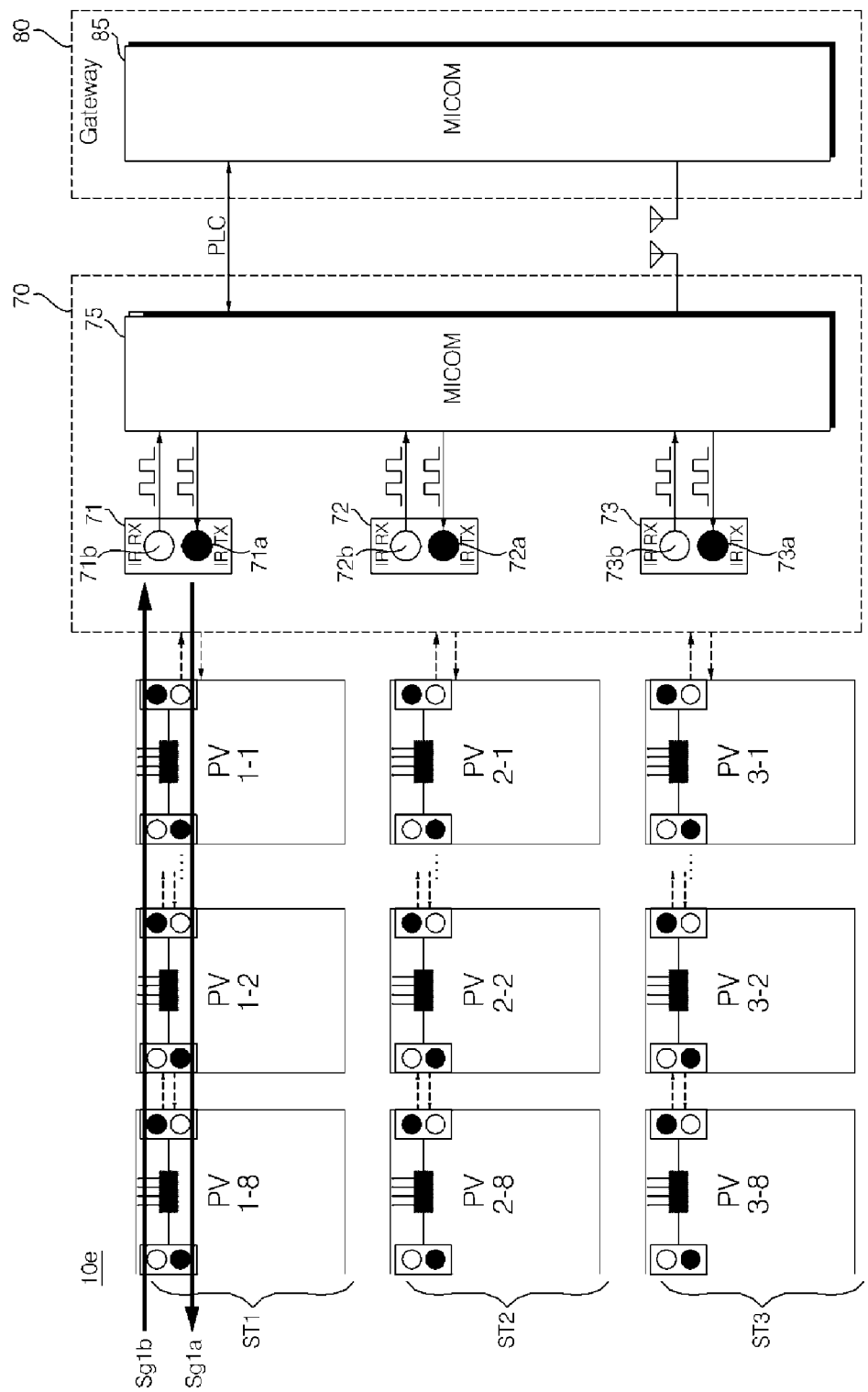
FIGS. 17A to 18B are reference diagrams for explaining the operation method of FIG. 16.

FIG. 17A illustrates transmission of a scan signal Sg1*a* and a response signal Sg1*b* for the first string ST1.

The scan signal from the gateway 80 is changed to an IR signal in the IR communication device 70 and is sequentially transmitted from the photovoltaic module PV1-1 to the photovoltaic module PV1-8 by IR communication.

Then, the response signal from the photovoltaic module PV1-8 is transmitted to the photovoltaic module PV1-1 by IR communication and is transmitted to the gateway 80 via the IR communication device 70.

To this end, as described above, each photovoltaic module 50 includes an IR communication unit 270 and a second IR communication unit 271.

Figure 17B:
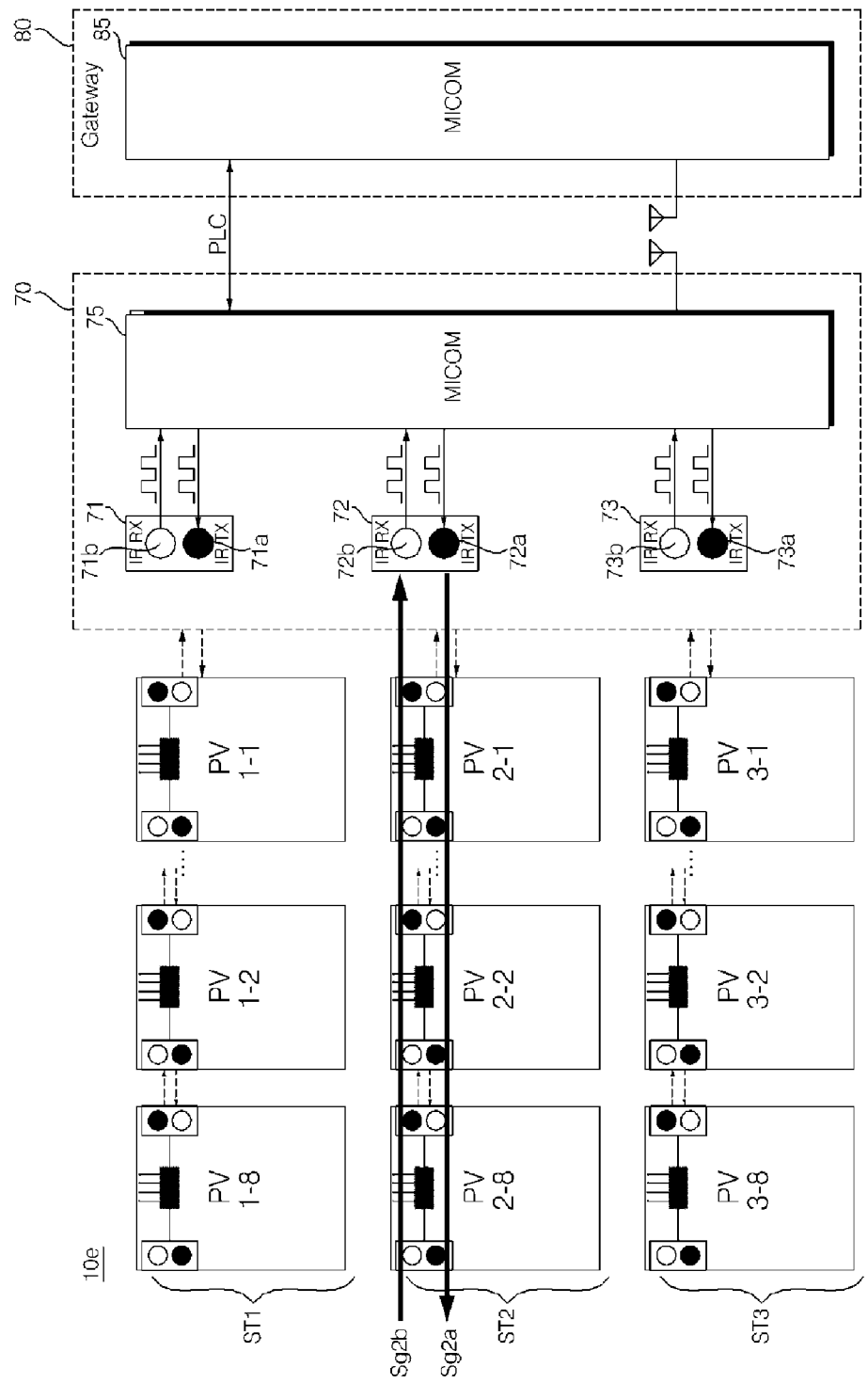

FIG. 17B illustrates transmission of a scan signal Sg2*a* and a response signal Sg2*b* for the second string ST2.

The scan signal from the gateway 80 is changed to an IR signal in the IR communication device 70 and sequentially transmitted from the photovoltaic module PV2-1 to the photovoltaic module PV2-8 by IR communication.

Then, the response signal from the photovoltaic module PV2-8 is transmitted to the photovoltaic module PV2-1 by IR communication and is transmitted to the gateway 80 via the IR communication device 70.

Figure 17C:
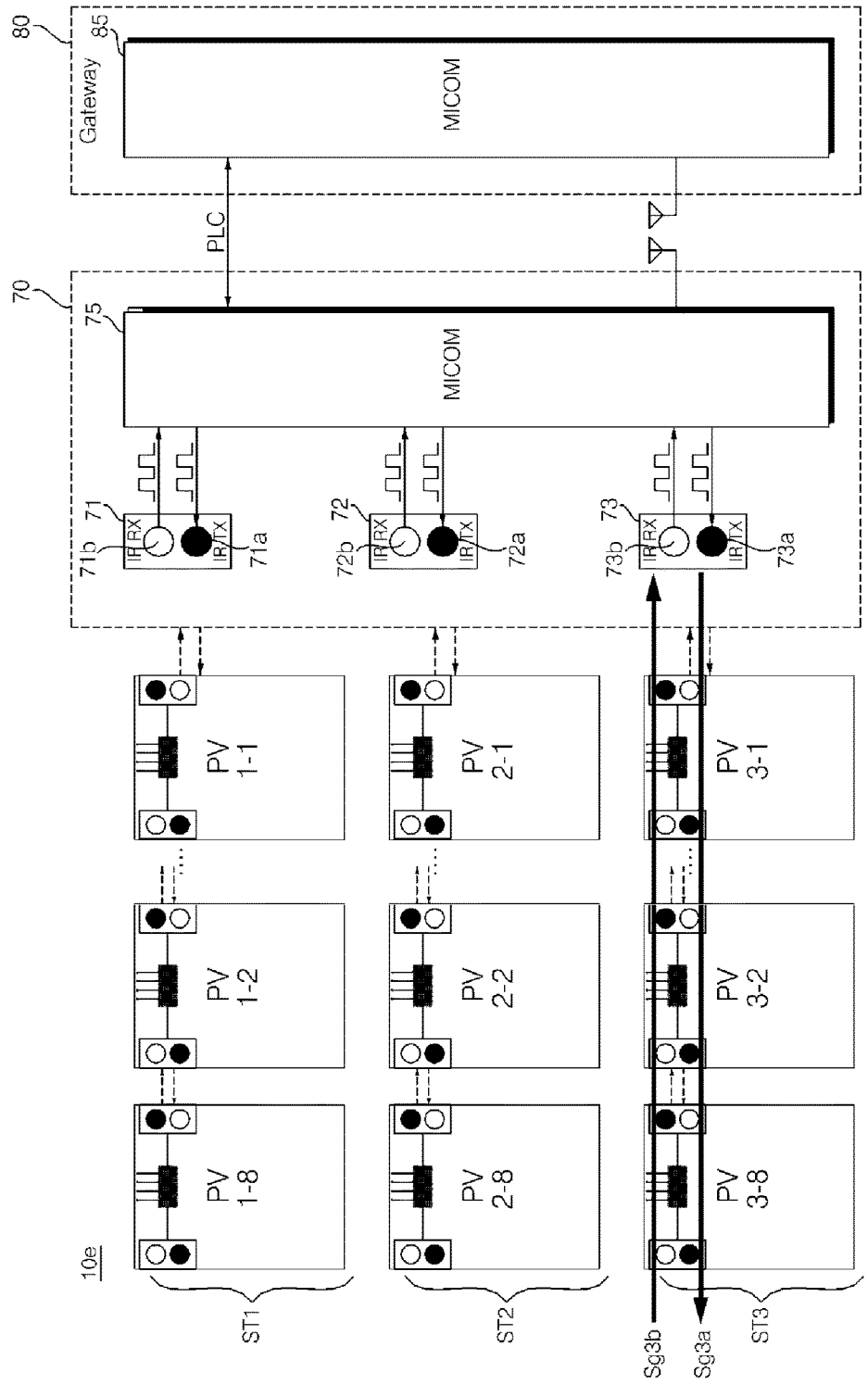

FIG. 17C illustrates transmission of a scan signal Sg3*a* and a response signal Sg3*b* for the third string ST3.

The scan signal from the gateway 80 is changed into an IR signal in the IR communication device 70 and is sequentially transmitted from the photovoltaic module PV3-1 to the photovoltaic module PV3-8 by IR communication.

Then, the response signal from the photovoltaic module PV3-8 is transmitted to the photovoltaic module PV3-1 by IR communication and is transmitted to the gateway 80 via the IR communication device 70.

Figure 18A:
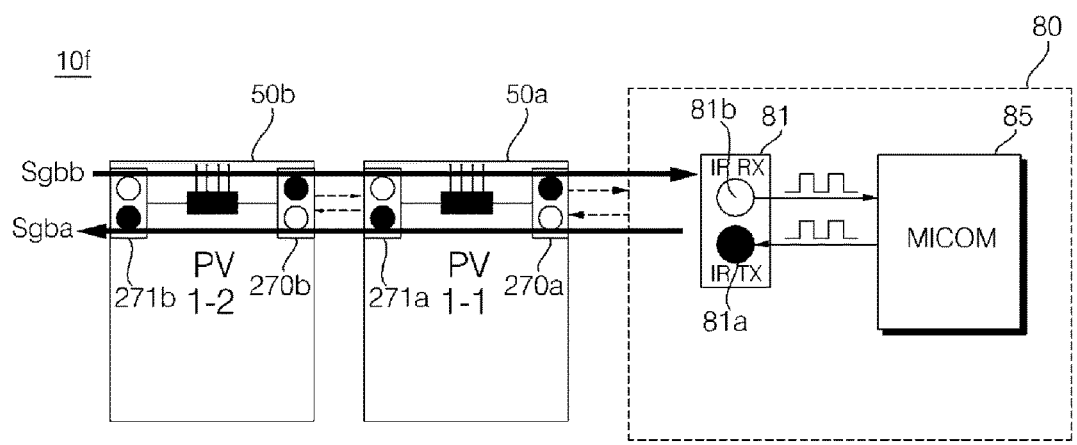

FIG. 18A shows an instance in which an IR communication device is not provided and transmission of a scan signal Sgba and a response signal Sgbb is performed between a plurality of photovoltaic modules 50*a* and 50*b* and a gateway 80.

Referring to FIG. 18A, the IR transmitter 81*a* of the IR communication unit 81 of the gateway 80 outputs a scan signal Sgba, which is transmitted to the IR receiver of the IR communication unit 270*a* of the first photovoltaic module 50*a*, the IR transmitter of the second IR communication unit 271*a*, the IR receiver of the IR communication unit 270*b* of the second photovoltaic module 50*b*, and the IR transmitter of the second IR communication unit 271*b*.

In response to the scan signal, a response signal in the form of an IR signal is transmitted to the IR receiver 81*b* of the IR communication unit 81 of the gateway via the IR receiver of the second IR communication unit 271*b* of the second photovoltaic module 50*b*, the IR transmitter of the IR communication unit 270*b*, the IR receiver of the second IR communication unit 271*a* of the photovoltaic module 50*a*, and the IR transmitter of the IR communication unit 270*a*.

Figure 18B:
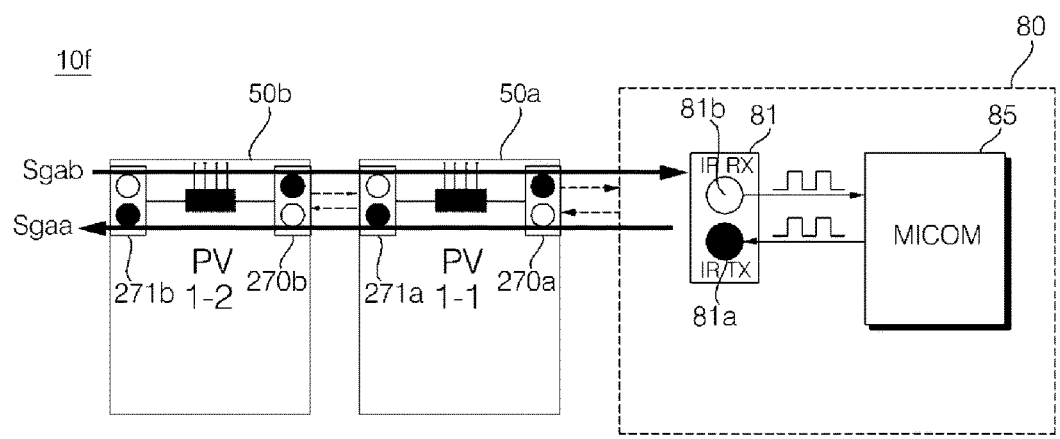

FIG. 18B illustrates an instance where an IR communication device is not provided, and transmission of a power generation information request signal Sgaa and a power generation information signal Sgab is performed between the plurality of photovoltaic modules 50*a* and 50*b* and the gateway 80.

Referring to FIG. 18B, the IR transmitter 81*a* of the IR communication unit 81 of the gateway 80 outputs the power generation information request signal Sgaa, which is transmitted to the IR receiver of the IR communication unit 270*a* of the first photovoltaic module 50*a*, the IR transmitter of the second IR communication unit 271*a*, the IR receiver of the IR communication unit 270*b* of the second photovoltaic module 50*b*, and the IR transmitter of the second IR communication unit 271*b*.

In response to the power generation information request signal Sgaa, a power generation information signal Sgab in the form of an IR signal is transmitted to the IR receiver 81*b* of the IR communication unit 81 of the gateway via the IR receiver of the second IR communication unit 271*b* of the second photovoltaic module 50*b*, the IR transmitter of the IR communication unit 270*b*, the IR receiver of the second IR communication unit 271*a* of the photovoltaic module 50*a*, and the IR transmitter of the IR communication unit 270*a*.

Thus, the IR communication unit 270 may include an IR receiver 270*r* for receiving a scan signal from the gateway 80 or an adjacent photovoltaic module and an IR transmitter 270*t* for transmitting the ID information to the gateway 80 or the adjacent photovoltaic module.

The IR transmitter 270*t* may transmit at least one of the voltage information on the solar cell module 100, the current information on the solar cell module 100, the voltage information on the inverter unit 540, and current information on the inverter unit 540 to the gateway 80 or the adjacent first photovoltaic modules 50*a* to 50*n*.

The second IR communication unit 271 may include an IR transmitter to transmit a scan signal to an adjacent photovoltaic module, and an IR receiver to receive ID information on the adjacent photovoltaic module from the adjacent photovoltaic module.

The IR receiver 270*b* may receive at least one of the voltage information and current information on the adjacent photovoltaic modules from the adjacent photovoltaic modules.

Figure 19:
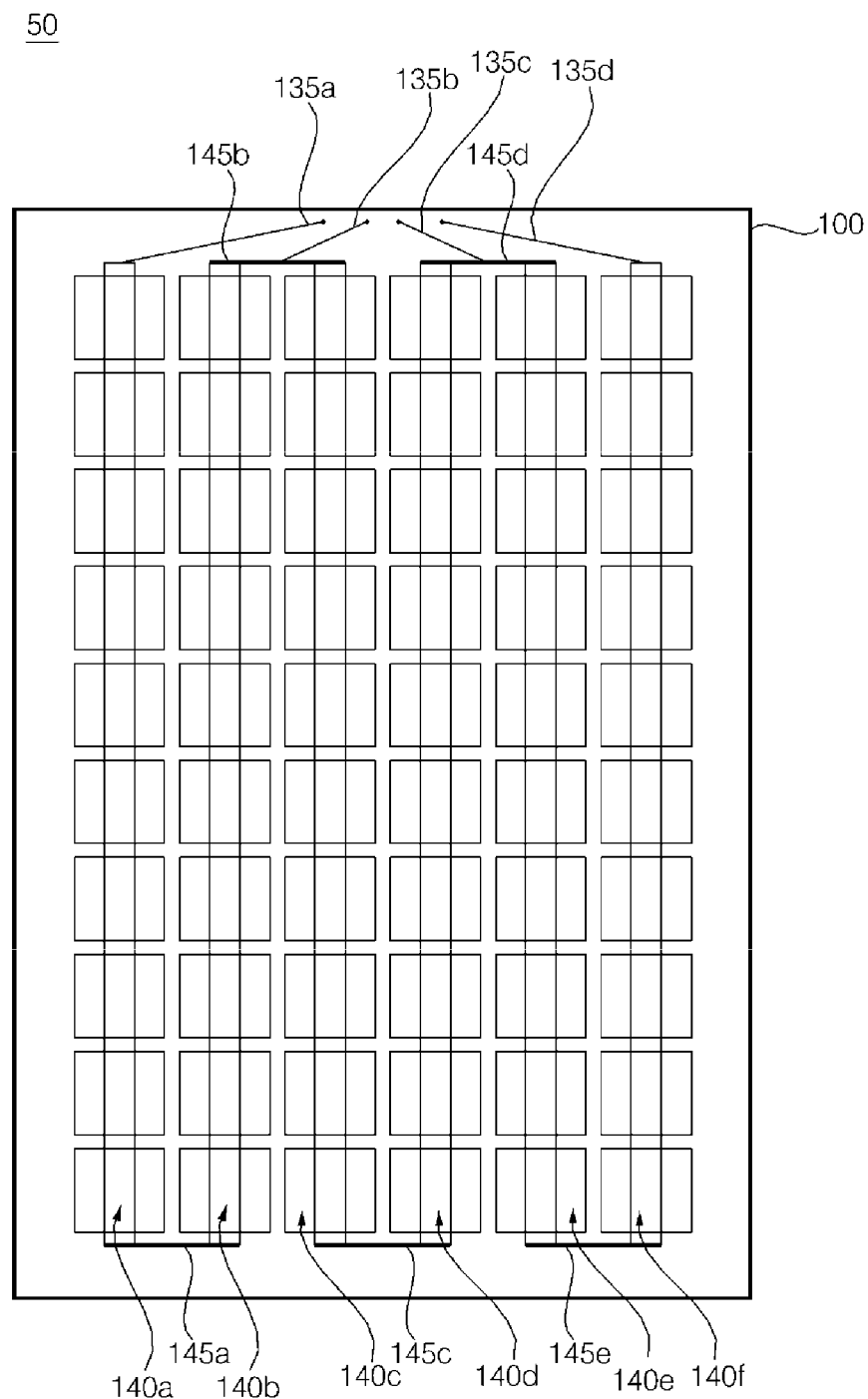
FIG. 19 is a front view showing the photovoltaic module of FIG. 3.
Figure 20:
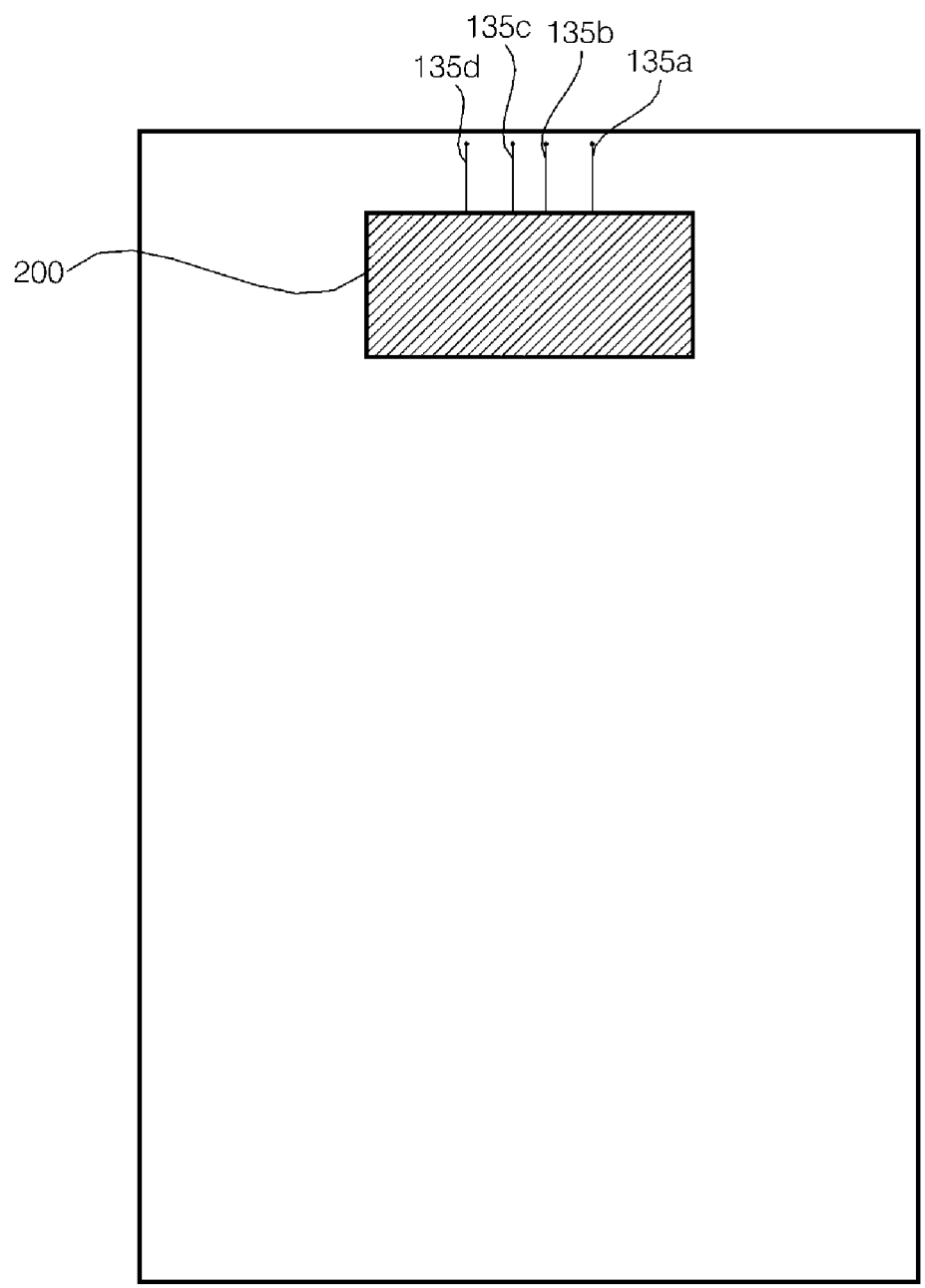
FIG. 20 is a rear view showing the photovoltaic module of FIG. 19.

FIG. 19 is a front view showing the photovoltaic module of FIG. 3, and FIG. 20 is a rear view showing the photovoltaic module of FIG. 19.

Referring to FIGS. 19 and 20, a photovoltaic module 50 according to an embodiment may include a solar cell module 100 and a junction box 200 positioned on the back surface of the solar cell module 100.

The junction box 200 may include at least one bypass diode that is bypassed in order to prevent hot spots in case of shadow occurrence or the like.

In FIG. 17 and the like, three bypass diodes (Da, Db, and Dc in FIG. 17) are provided according to the four solar cell strings of FIG. 19.

Meanwhile, the junction box 200 may convert the DC power supplied from the solar cell module 100. For details, see FIG. 17 and subsequent figures.

The solar cell module 100 may include a plurality of solar cells.

The figures illustrate that a plurality of solar cells is connected in series by ribbons 133 (see FIG. 21) to form a solar cell string 140. Thereby, six strings 140*a*, 140*b*, 140*c*, 140*d*, 140*e* and 140*f* are formed, each of which includes ten solar cells. Various modifications may be made to the illustrated example.

The respective solar cell strings may be electrically connected by bus ribbons. FIG. 19 illustrates that the first solar cell string 140*a* is electrically connected with the second solar cell string 140*b*, the third solar cell string 140*c* is electrically connected with the fourth solar cell string 140*d*, and the fifth solar cell string 140*e* is electrically connected with the sixth solar cell string 140*f*, by the bus ribbons 145*a*, 145*c* and 145*e* disposed at the lower portion of the solar cell module 100, respectively.

FIG. 19 also illustrates that the second solar cell string 140*b* is electrically connected with the third solar cell string 140*c*, and the third solar cell string 140*d* is electrically connected with the fifth solar cell string 140*e*, by the bus ribbons 145*b* and 145*d* disposed at the upper portion of the solar cell module 100, respectively.

The ribbon connected to the first string, the bus ribbons 145*b* and 145*d*, and the ribbon connected to the fourth string may be electrically connected to the first to fourth conductive lines 135*a*, 135*b*, 135*c*, and 135*d*, respectively. The first to fourth conductive lines 135*a*, 135*b*, 135*c*, and 135*d* may be electrically connected to the bypass diodes Da, Db, and Dc (see FIG. 17) in the junction box 200 disposed on the back surface of the solar cell module 100, through openings formed in the solar cell module 100. In the figure, the first to fourth conductive lines 135*a*, 135*b*, 135*c*, and 135*d* are illustrated as extending to the back surface of the solar cell module 100 through the openings formed in the solar cell module 100.

The junction box 200 is preferably disposed closer to an end of the solar cell module 100 to which the conductive lines extend between both ends of the solar cell module 100.

Figure 21:
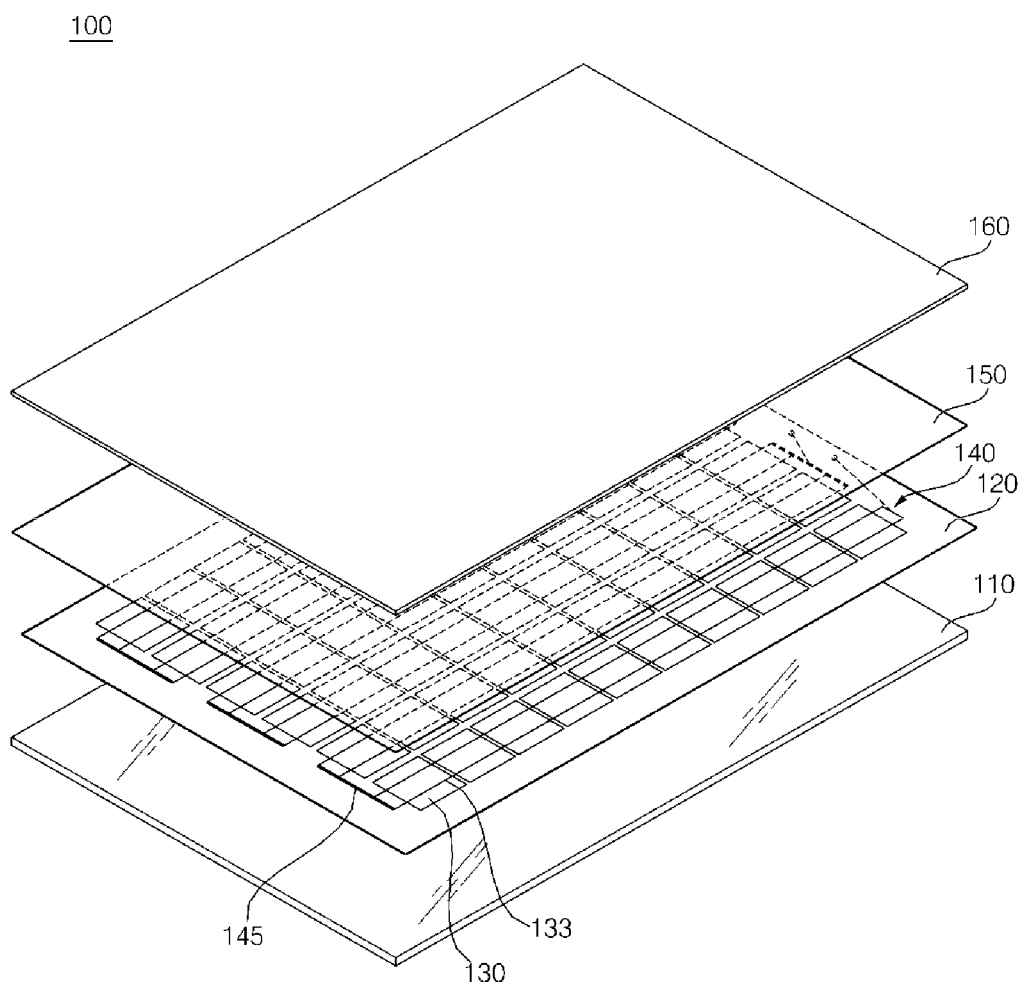
FIG. 21 is an exploded perspective view showing the solar cell module of FIG. 19.

FIG. 21 is an exploded perspective view showing the solar cell module of FIG. 19.

Referring to FIG. 21, the solar cell module 100 of FIG. 11 may include a plurality of solar cells 130. The solar cell module 100 may further include a first sealing member 120 and a second sealing member 150 located on the lower surface and upper surface of the plurality of solar cells 130, a rear substrate 110 located on the lower surface of the first sealing member 120, and a front substrate 160 located on the upper surface of the second sealing member 120.

The solar cell 130 may be a semiconductor device that converts sunlight into electrical energy. The solar cell 130 may be a silicon solar cell, a compound semiconductor solar cell, a tandem solar cell, a dye-sensitized CdTe or CIGS type solar cell, a thin film solar cell, or the like.

The solar cell 130 includes a light receiving surface onto which sunlight is incident and a surface opposite to the light receiving surface. For example, the solar cell 130 may include a silicon substrate of a first conductive type, a second conductive type semiconductor layer formed on the silicon substrate and having a conductive type opposite to the first conductive type, an antireflection film formed on the second conductive type semiconductor layer and having at least one opening exposing a part of the surface of the second conductive type semiconductor layer, a front electrode contacting the part of the surface of the second conductive type semiconductor layer exposed through the at least one opening, and a rear electrode formed on the rear surface of the silicon substrate.

The respective solar cells 130 may be electrically connected in series, parallel, or series-parallel. Specifically, the plurality of solar cells 130 may be electrically connected by a ribbon 133. The ribbon 133 may be bonded to the front electrode formed on the light receiving surface of a solar cell 130 and the rear electrode formed on the opposite surface of an adjacent solar cell 130.

In FIG. 13, it is illustrated that the ribbon 133 is formed in two rows, and the solar cells 130 are connected in a row by the ribbon 133 to form the solar cell string 140.

Thus, six strings 140*a*, 140*b*, 140*c*, 140*d*, 140*e* and 140*f* may be formed as described with reference to FIG. 19, and each string may include ten solar cells.

The rear substrate 110 may have waterproof, insulating and ultraviolet shielding functions as a back sheet, and may have a TPT (Tedlar/PET/Tedlar) structure. However, embodiments of the present invention are not limited thereto. While the rear substrate 110 is illustrated in FIG. 17 as having a rectangular shape, the rear substrate 110 may be fabricated in various shapes such as a circular shape and a semicircular shape depending on the environment in which the solar cell module 100 is installed.

The first sealing member 120 may have the same size as that of the rear substrate 110 and be attached to the rear substrate 110, and the plurality of solar cells 130 may be positioned adjacent to each other on the first sealing member 120 such that the solar cells 130 are arranged in several rows.

The second sealing member 150 may be positioned on the solar cells 130 and be bonded to the first sealing member 120 by lamination.

Here, the first sealing member 120 and the second sealing member 150 allow the elements of the solar cell to be chemically bonded. Examples of the first sealing member 120 and the second sealing member 150 may include an ethylene vinyl acetate (EVA) film.

The front substrate 160 is preferably positioned on the second sealing member 150 so as to transmit sunlight, and is preferably made of tempered glass in order to protect the solar cells 130 from external shock or the like. More preferably, the front substrate 160 is made of tempered low-iron glass having a low iron content in order to prevent reflection of sunlight and increase transmittance of sunlight.

The solar cell module and the photovoltaic system including the same according to the present invention are not limited to the configurations and methods of the embodiments described above. Variations may be made to the embodiments described above by selectively combining all or some of the embodiments.

As is apparent from the above description, according to embodiments of the present invention, a photovoltaic module according to an embodiment of the present invention includes a solar cell module having a plurality of solar cells, an inverter unit to output AC power converted from DC power from the solar cell module, an infrared (IR) receiver to receive a data transmission request from an external terminal, and a light output unit to transmit data corresponding to the data transmission request using output light. Thereby, the solar module may communicate with the external terminal in a simple manner.

In particular, when the data transmission request is received from the terminal through the IR receiver with the terminal located near a first area in the photovoltaic module, the data corresponding to the data transmission request is transmitted. Thereby, bidirectional communication with the terminal may be stably performed without interference with the photovoltaic module.

The photovoltaic module transmits, through the light output unit, at least one of the output current information and the output voltage information about the inverter unit, the output power information about the photovoltaic module, the frequency information about the AC power output from the inverter unit, and fault status information. Thereby, the terminal may monitor the operation state of the photovoltaic module in a simple manner.

When the photovoltaic module receives firmware update information, it may easily perform firmware update using the firmware update information.

A photovoltaic system according to an embodiment of the present invention to achieve the above object includes a photovoltaic module to output AC power to a grid, the photovoltaic module including an infrared (IR) receiver and a light output unit, and a terminal including an IR transmitter for IR transmission and an light receiver to detect light output of the photovoltaic module, wherein the terminal transmits a data transmission request through the IR transmitter and receives data from the photovoltaic module via the light receiver. Thereby, directional communication may be performed between the photovoltaic module and the terminal in a simple manner.

According to another embodiment of the present invention, a photovoltaic module includes a solar cell module having a plurality of solar cells, an inverter unit to output AC power converted from DC power from the solar cell module, a cable to output the AC power from the inverter unit, and an infrared (IR) communication unit to transmit at least one of voltage information on the solar cell module and current information on the solar cell module, voltage information on the inverter unit, and current information on the inverter unit to an adjacent first photovoltaic module, an external gateway, or an external IR communication device. Thereby, power consumption is reduced in communicating with the gateway or the adjacent solar module.

Further, by providing the IR communication unit rather than the power line communication unit in the photovoltaic module, the manufacturing costs of the photovoltaic module may be reduced.

The photovoltaic module may further include a second IR communication unit to receive at least one of voltage information on a solar cell module in a second photovoltaic module adjacent to an opposite side of the first photovoltaic module, current information on the solar cell module in the second photovoltaic module, voltage information on an inverter unit in the second photovoltaic module, and current information on the inverter unit in the second photovoltaic module. Thereby, bidirectional IR communication may be performed.

Meanwhile, openings are formed in both side surfaces of a frame, that is, in the side surface area where the second IR communication unit is disposed. Thereby IR communication may be smoothly performed.

The photovoltaic module receives a scan signal from the gateway, transmits the same to an adjacent photovoltaic module, and transmits the ID information thereon to the gateway. Thereby, the gateway may easily identify a plurality of photovoltaic modules.

Further, the photovoltaic module may be utilized in array building of a plurality of photovoltaic modules.

According to another embodiment of the present invention, a photovoltaic system includes a plurality of photovoltaic modules for outputting AC power to a grid and outputting power generation information by infrared (IR) communication, an IR communication device to receive the power generation information from the photovoltaic modules by the IR communication, and a gateway to receive the power generation information from the IR communication device based on wired or wireless communication other than the IR communication. Thereby, power consumption may be reduced in communicating with the gateway or an adjacent photovoltaic module.

According to still another embodiment of the present invention, a photovoltaic system includes a plurality of photovoltaic modules for outputting AC power to a grid and outputting power generation information by infrared (IR) communication, an IR communication device to receive power generation information from the photovoltaic modules by the IR communication, and a gateway to receive the power generation information from the IR communication device based on wired or wireless communication other than the IR communication. Thereby, power consumption may be reduced in communicating with the gateway or an adjacent photovoltaic module.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A photovoltaic module comprising:
a solar cell module having a plurality of solar cells;
an inverter to convert direct current (DC) power from the solar cell module to alternating current (AC) power, and to output the AC power;
an infrared (IR) receiver to receive a data transmission request from an external terminal;
a light output unit to transmit data corresponding to the data transmission request using light; and
a controller to perform a control operation to transmit the data corresponding to the data transmission request when the data transmission request is received from the external terminal through the IR receiver when the external terminal is located near a first area in the photovoltaic module,
wherein, when the controller receives a request for transmission of power information of the photovoltaic module through the IR receiver, the controller performs a control operation to transmit at least one of output current information of the inverter, output voltage information of the inverter, output power information of the photovoltaic module, frequency information of the AC power output from the inverter, and fault status information via the light output unit.

2. The photovoltaic module according to claim 1, wherein the controller controls operation of the inverter based on an output current and output voltage of the inverter.

3. The photovoltaic module according to claim 1, further comprising a memory,
wherein, when firmware update information is received via the IR receiver, the controller performs a control operation to update firmware stored in the memory using the firmware update information.

4. The photovoltaic module according to claim 3, wherein the firmware update information comprises at least one of allowable output voltage range information, allowable output frequency range information, and single-phase or three-phase output information of the inverter.

5. The photovoltaic module according to claim 1, wherein the light output unit comprises a light emitting diode (LED),
wherein the light output unit transmits the data corresponding to the data transmission request based on a turn-on time and a turn-off time of the LED.

6. The photovoltaic module according to claim 1, further comprising:

a junction box disposed on a back surface of the solar cell module; and a lens formed on the junction box, wherein the IR receiver and the light output unit are disposed under the lens.

7. The photovoltaic module according to claim 6, further comprising:

a coupling member coupled to an opening formed in an outer frame of the junction box, wherein the lens is disposed on a head of the coupling member.

8. A photovoltaic system comprising:

a photovoltaic module to output alternating current (AC) power to a grid, the photovoltaic module comprising an infrared (IR) receiver and a light output unit; and a terminal comprising an IR transmitter for IR transmission and a light receiver to detect a light output of the photovoltaic module, wherein the terminal transmits a data transmission request through the IR transmitter and receives data from the photovoltaic module via the light receiver;

wherein the photovoltaic module further comprises a controller to perform a control operation to transmit data corresponding to the data transmission request when the data transmission request is received from an external terminal through the IR receiver when the external terminal is located near a first area in the photovoltaic module, and wherein, when the controller receives a request for transmission of power information of the photovoltaic module through the IR receiver, the controller performs a control operation to transmit at least one of output current information of an inverter of the photovoltaic module, output voltage information of the inverter, output power information of the photovoltaic module, frequency information of the AC power output from the inverter, and fault status information via the light output unit.

9. The photovoltaic system according to claim 8, wherein the terminal comprises:

a pulse output unit to output a pulse from a signal waveform output from the light receiver;

a controller to receive the data from the pulse from the pulse output unit; and a communication unit to transmit the received data to an external server or a gateway.

10. A photovoltaic module comprising:

a first solar cell module having a plurality of solar cells;

a first inverter to convert direct current (DC) power from the first solar cell module to alternating current (AC) power;

a cable to output the AC power from the first inverter;

a first infrared (IR) communication unit to transmit, at least one of voltage information of the first solar cell module, current information of the first solar cell module, voltage information of the first inverter, and current information of the first inverter, to an adjacent first photovoltaic module, an external gateway, or an external IR communication device; and a second IR communication unit to receive at least one of voltage information of a second solar cell module in a second photovoltaic module adjacent to an opposite side of the first photovoltaic module, current information of the second solar cell module in the second photovoltaic module, voltage information of a second inverter in the second photovoltaic module, and current information of the second inverter in the second photovoltaic module, wherein the first IR communication unit transmits, at least one of the voltage information of the second solar cell module, the current information of the second solar cell module, the voltage information of the second inverter of the second photovoltaic module, and the current information of the second inverter of the second photovoltaic module, to the adjacent first photovoltaic module, the external gateway, or the external IR communication device.

11. The photovoltaic module according to claim 10, wherein the first IR communication unit and the second IR communication unit are disposed at both lateral ends of the photovoltaic module, respectively.

12. The photovoltaic module according to claim 10, further comprising:

a frame surrounding the first solar cell module, wherein the first IR communication unit and the second IR communication unit are disposed adjacent to both sides of the frame, and wherein an opening is formed in a side area of the frame in which the first IR communication unit and the second IR communication unit are disposed.

13. The photovoltaic module according to claim 10, wherein the first IR communication unit comprises:

an IR receiver to receive a scan signal from the gateway, the external IR communication device, or the adjacent first photovoltaic module; and an IR transmitter to transmit identification (ID) information to the gateway, the external IR communication device, or the adjacent first photovoltaic module.

14. The photovoltaic module according to claim 13, wherein the IR transmitter transmits, at least one of the voltage information of the first solar cell module, the current information of the first solar cell module, the voltage information of the first inverter, and the current information of the first inverter, to the gateway, the first IR communication device or the adjacent first photovoltaic module.

15. The photovoltaic module according to claim 10, wherein the second IR communication unit comprises:

an IR transmitter to transmit a scan signal to the adjacent second photovoltaic module; and an IR receiver to receive ID information of the second photovoltaic module from the adjacent second photovoltaic module.

16. The photovoltaic module according to claim 15, wherein the IR receiver receives at least one of voltage information and current information of the second photovoltaic module from the adjacent second photovoltaic module.

17. A photovoltaic system comprising:

a plurality of photovoltaic modules to output alternating current (AC) power to a grid and to output power generation information by infrared (IR) communication;

an IR communication device to receive the power generation information from the plurality of photovoltaic modules by the IR communication; and a gateway to receive the power generation information from the IR communication device based on wired or wireless communication other than the IR communication, wherein a photovoltaic module of the plurality of photovoltaic modules comprises:

a first solar cell module having a plurality of solar cells;

a first inverter to convert direct current (DC) power from the first solar cell module to alternating current (AC) power;

a cable to output the AC power from the first inverter;

a first infrared (IR) communication unit to transmit, at least one of voltage information of the first solar cell module, current information of the first solar cell module, voltage information of the first inverter, and current information of the first inverter, to an adjacent first photovoltaic module, an external gateway, or an external IR communication device; and a second IR communication unit to receive at least one of voltage information of a second solar cell module in a second photovoltaic module adjacent to an opposite side of the first photovoltaic module, current information of the second solar cell module in the second photovoltaic module, voltage information of a second inverter in the second photovoltaic module, and current information of the second inverter in the second photovoltaic module, and wherein the first IR communication unit transmits, at least one of the voltage information of the second solar cell module, the current information of the second solar cell module, the voltage information of second inverter of the second photovoltaic module, and the current information of the second inverter of the second photovoltaic module, to the adjacent first photovoltaic module, the external gateway, or the external IR communication device.

* * * * *